April 23, 1963   A. S. CLARK ET AL   3,086,230
AUTOMATION OF SHOEMAKING MACHINERY
Filed June 5, 1961   21 Sheets-Sheet 1

Inventors
Alfred S. Clark
Adolph S. Dorosz
Andrew J. Gilbride
John E. Walsh
By their Attorney Robert E. Ross

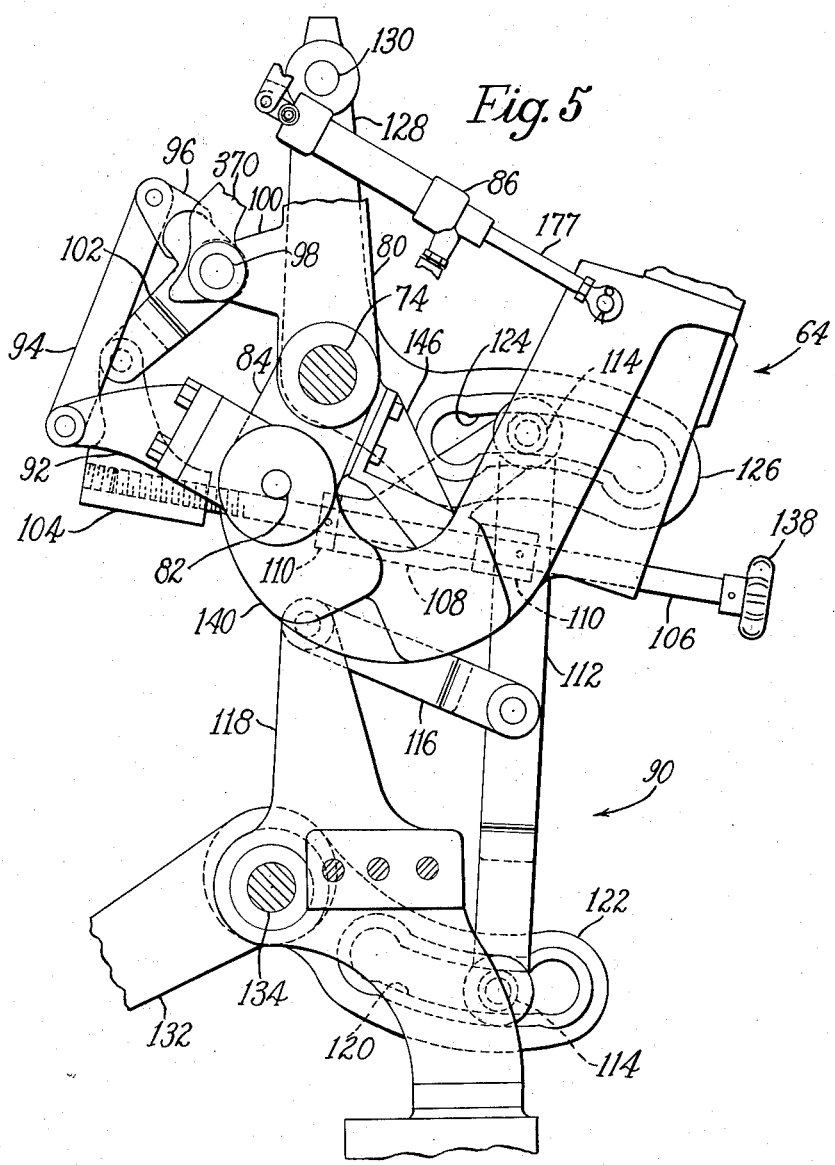

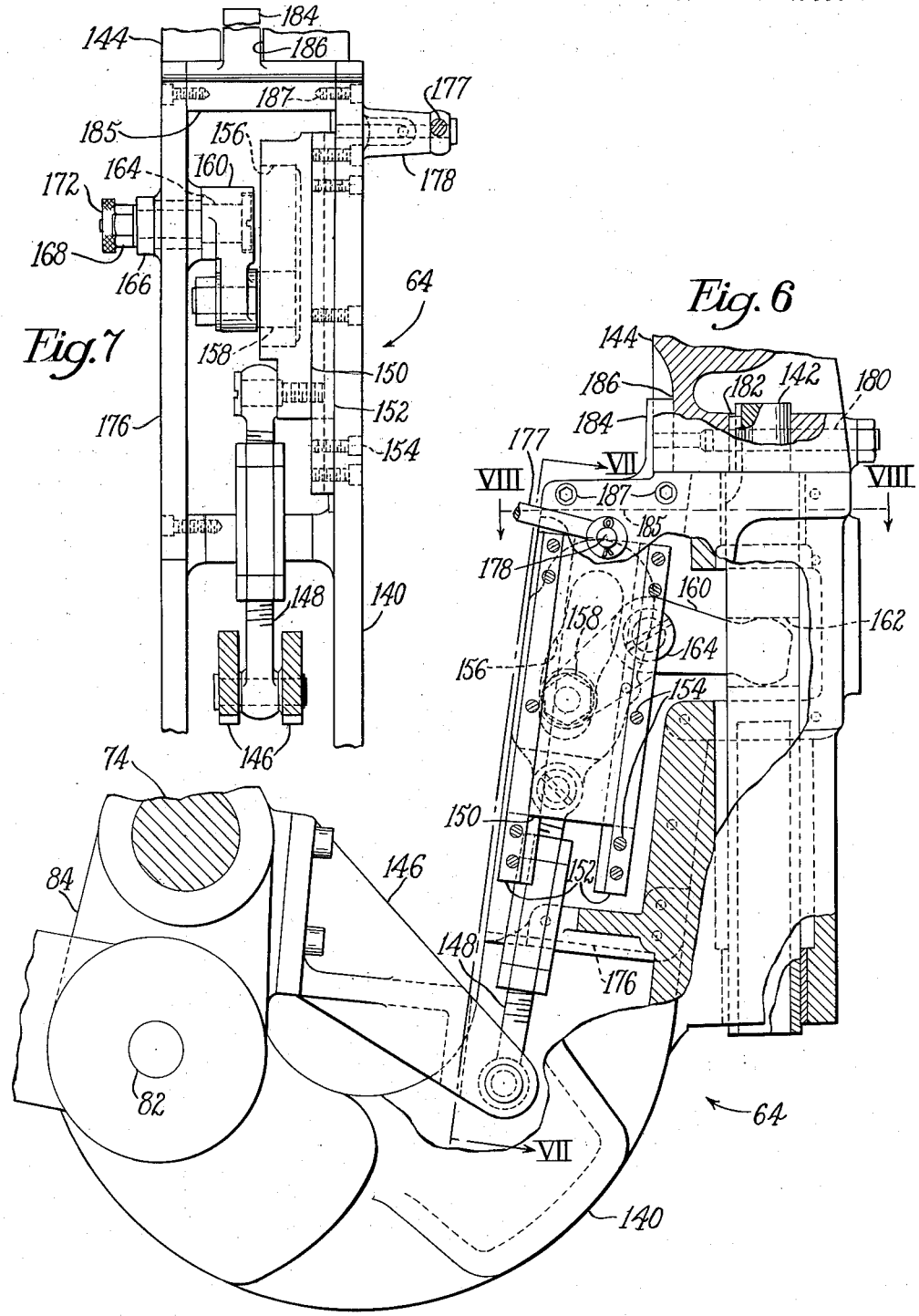

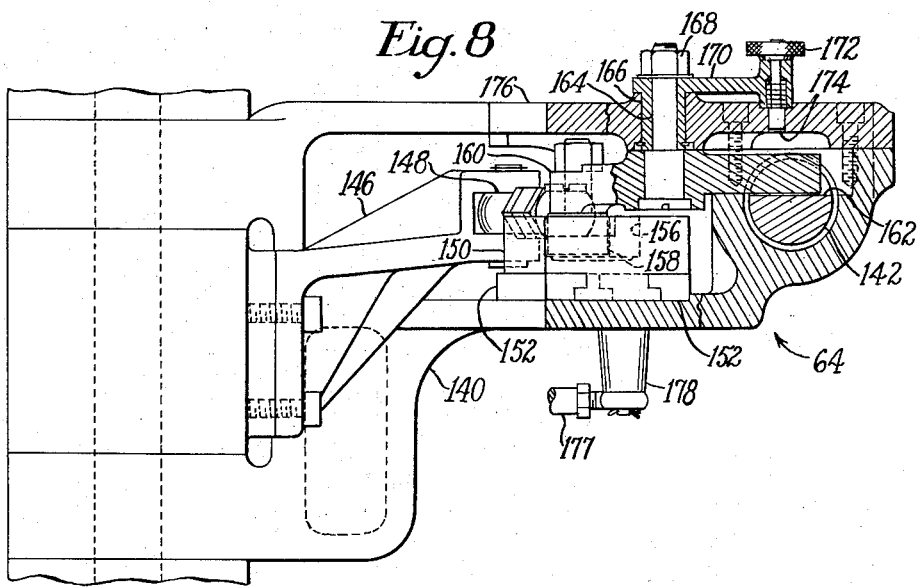
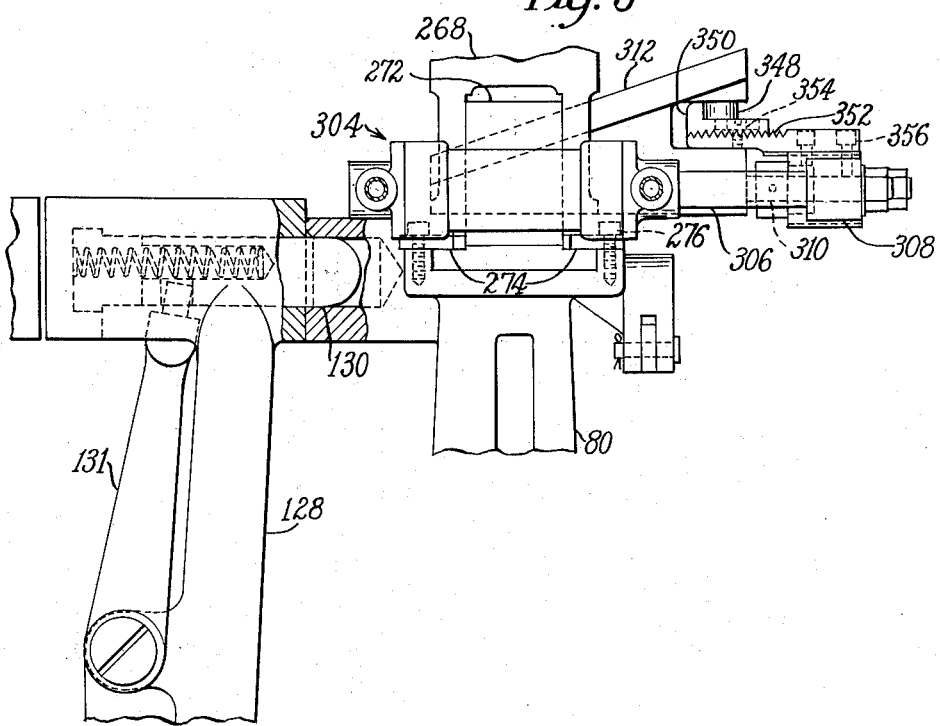

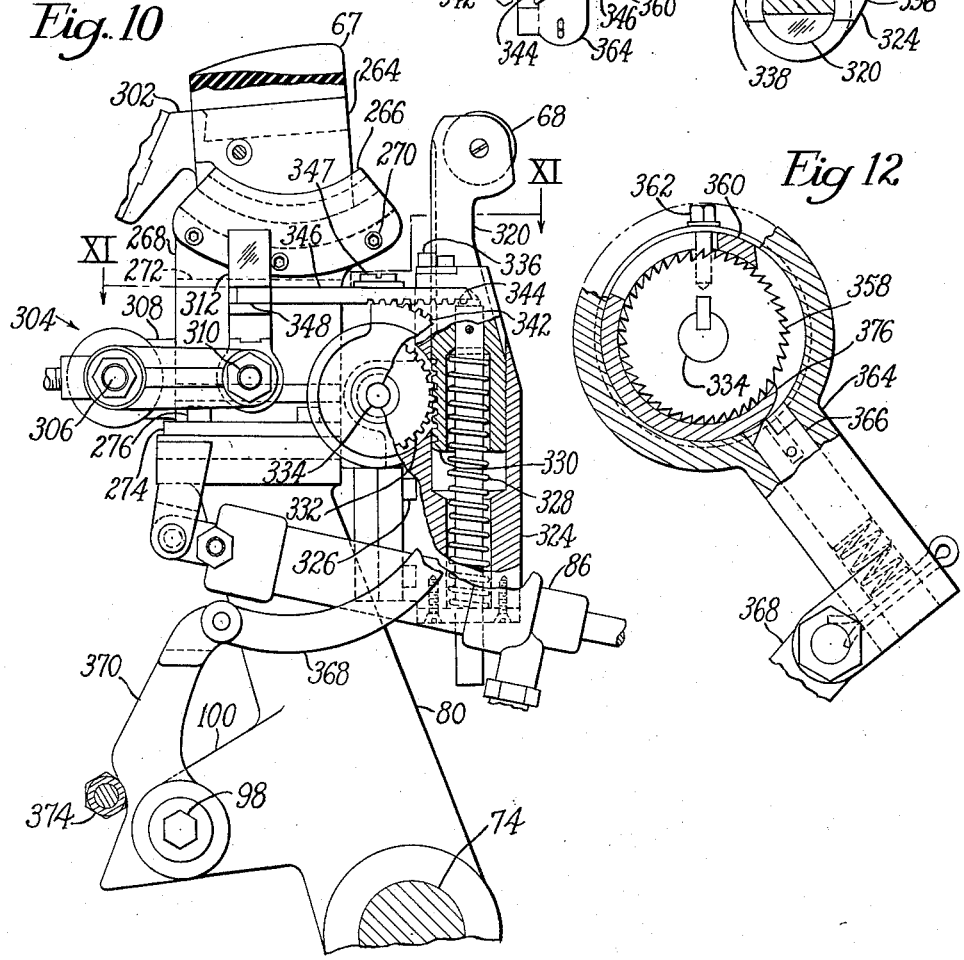

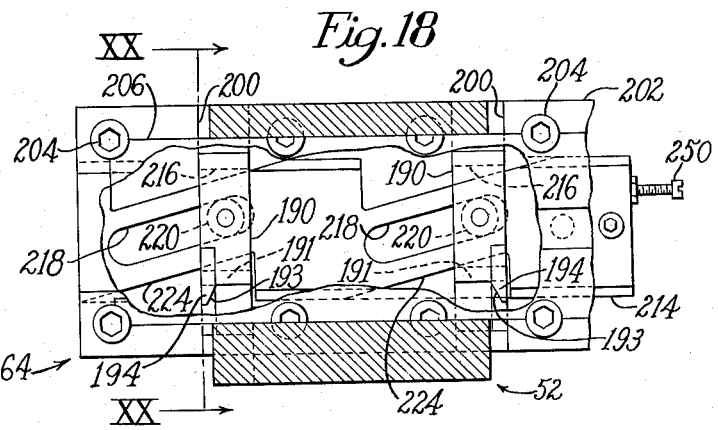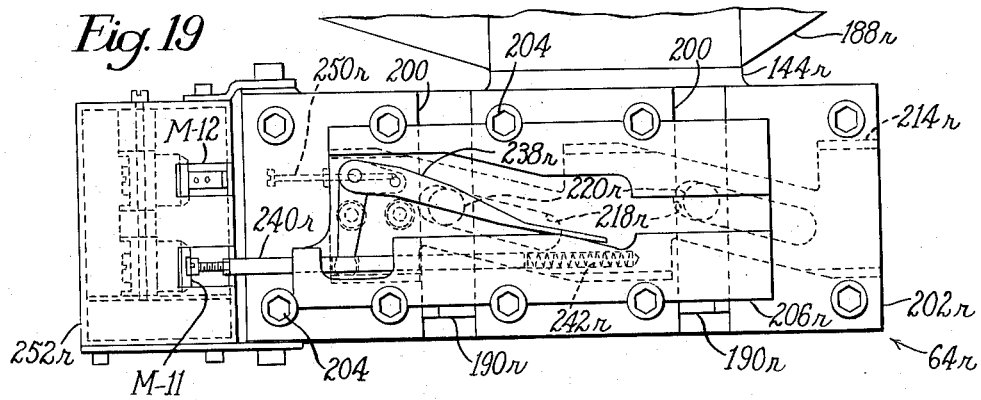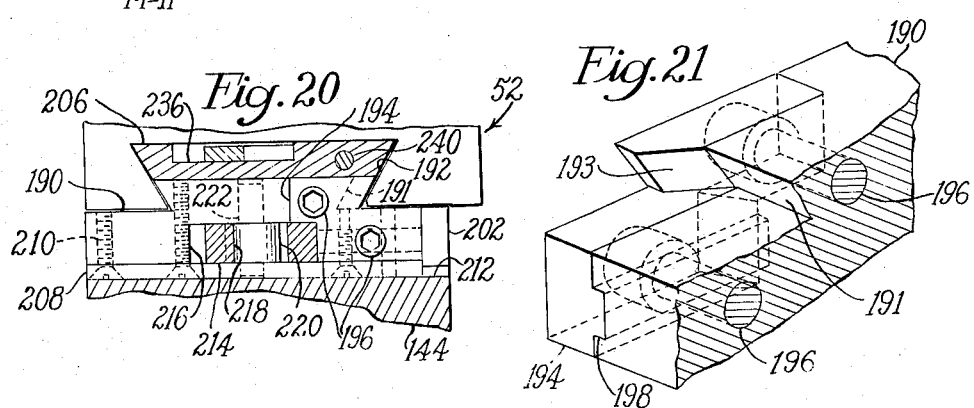

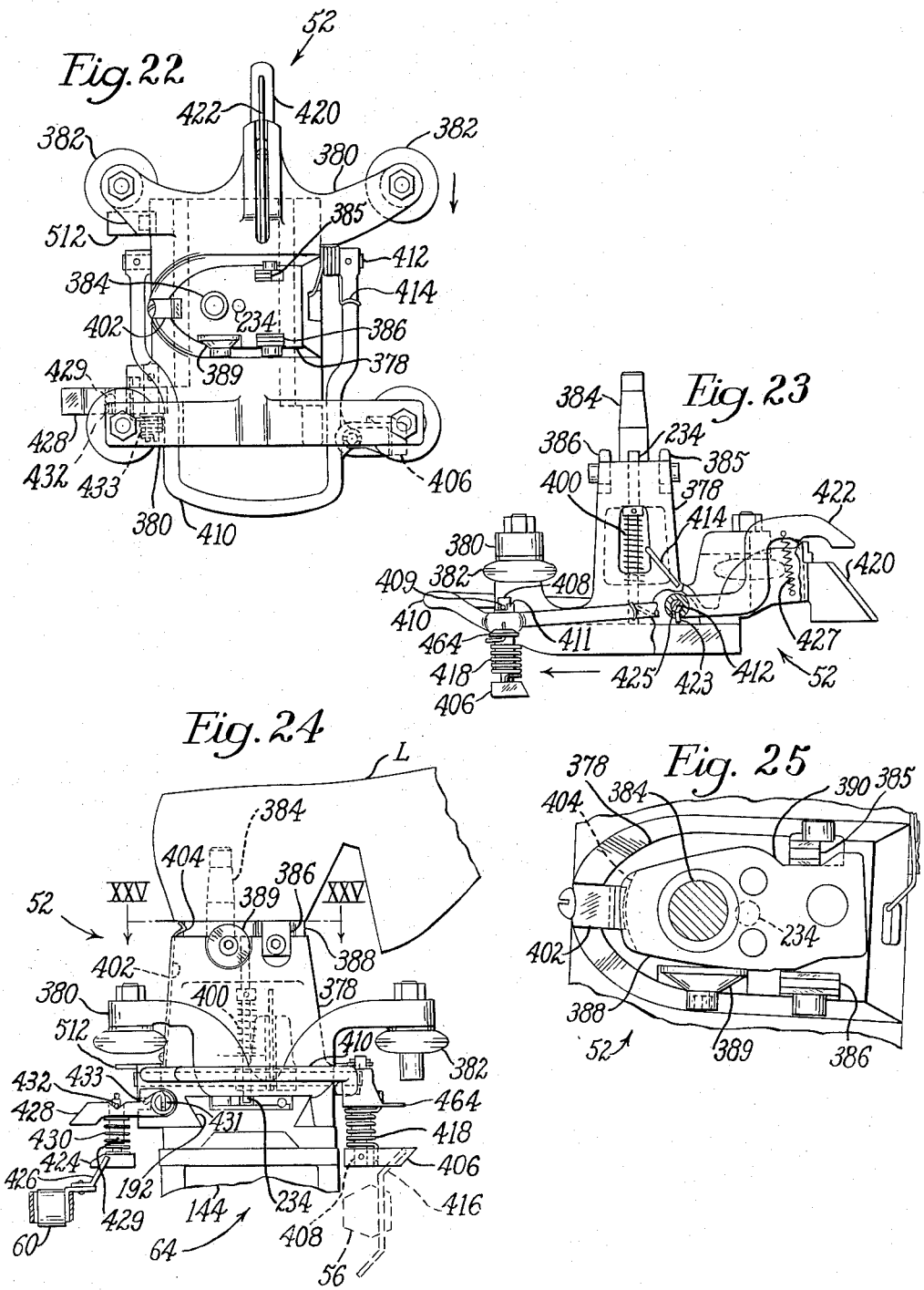

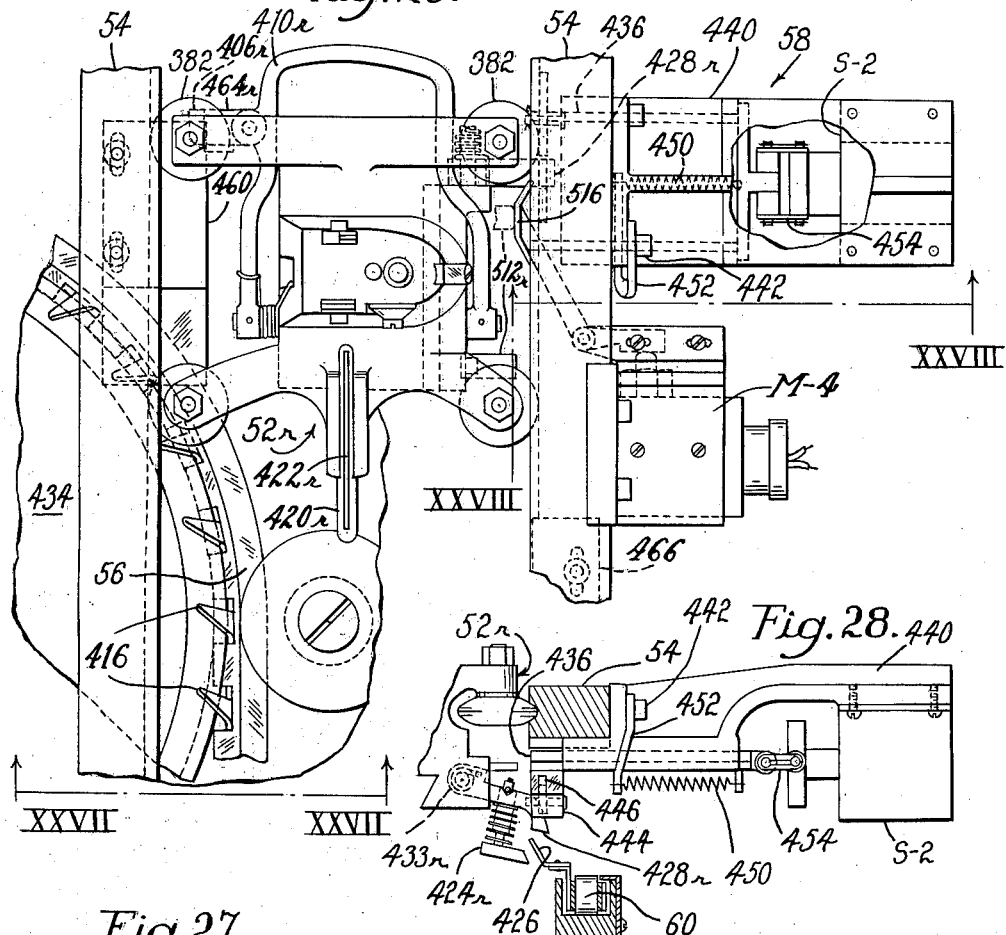
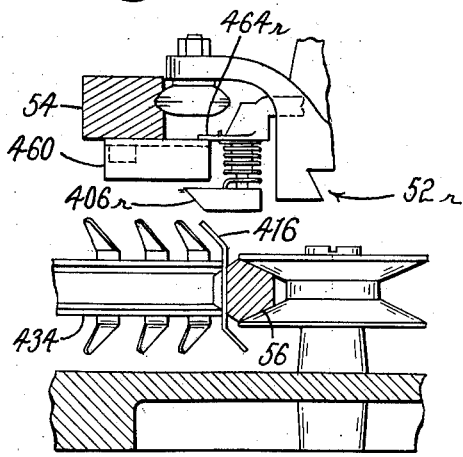

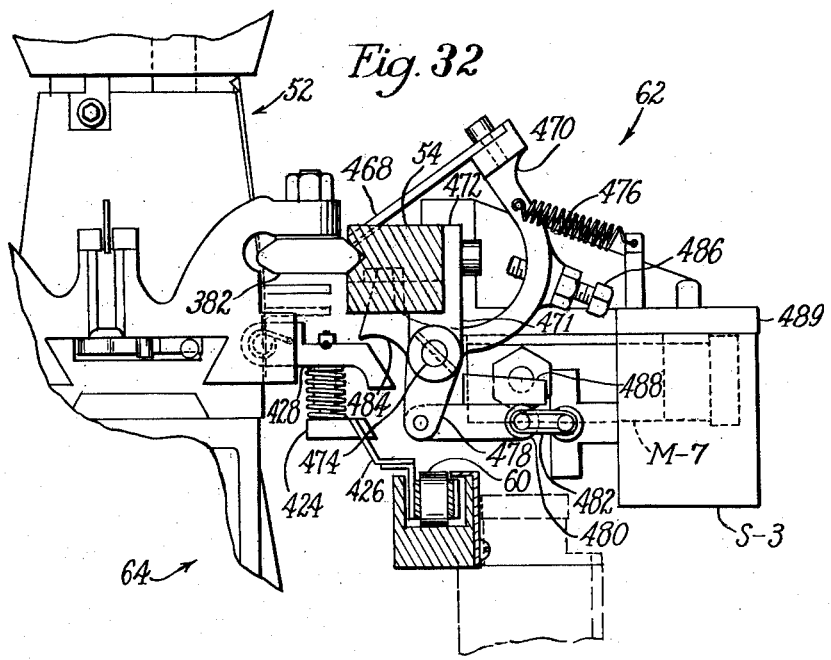
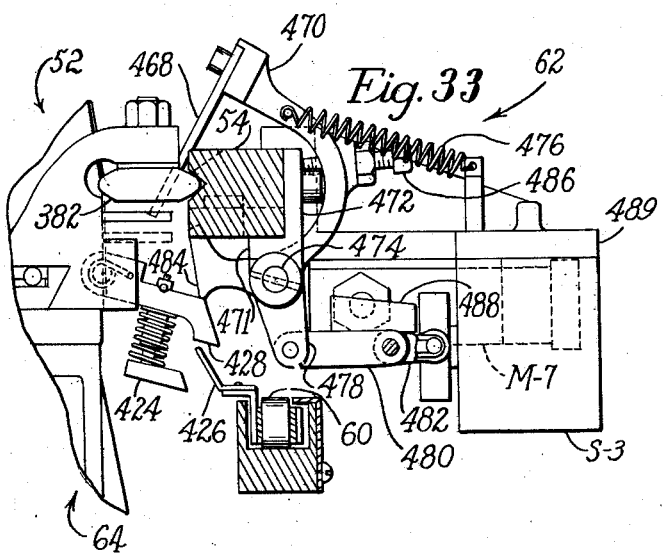

April 23, 1963  A. S. CLARK ET AL  3,086,230
AUTOMATION OF SHOEMAKING MACHINERY
Filed June 5, 1961  21 Sheets-Sheet 16

April 23, 1963 A. S. CLARK ET AL 3,086,230
AUTOMATION OF SHOEMAKING MACHINERY
Filed June 5, 1961 21 Sheets-Sheet 17
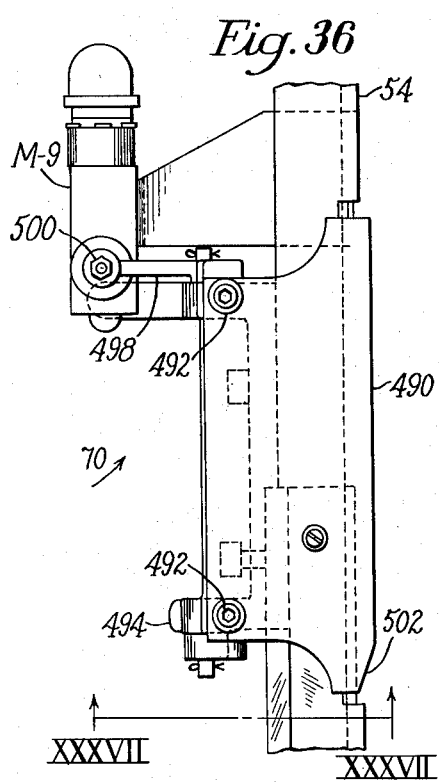
Fig. 36
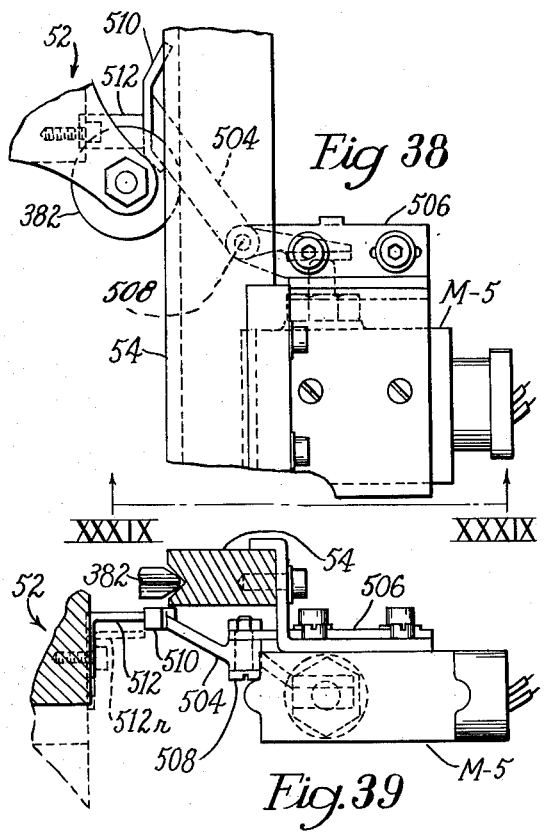
Fig. 38
Fig. 39
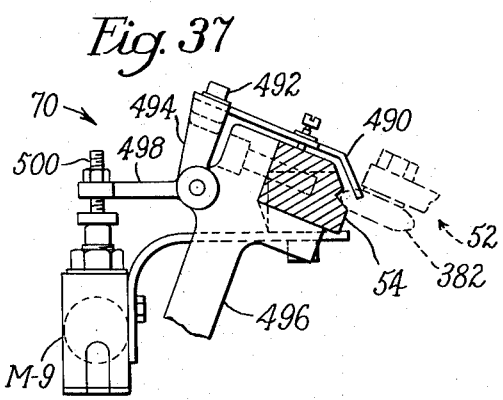
Fig. 37

April 23, 1963   A. S. CLARK ET AL   3,086,230
AUTOMATION OF SHOEMAKING MACHINERY
Filed June 5, 1961   21 Sheets-Sheet 21

— # United States Patent Office 3,086,230
Patented Apr. 23, 1963

3,086,230
AUTOMATION OF SHOEMAKING MACHINERY
Alfred S. Clark and Adolph S. Dorosz, Beverly, Andrew J. Gilbride, Swampscott, and John E. Walsh, Beverly, Mass., assignors to United Shoe Machinery Corporation, Flemington, N.J., a corporation of New Jersey
Filed June 5, 1961, Ser. No. 114,957
5 Claims. (Cl. 12—1)

The present invention relates to automation of shoemaking machines, and more particularly to novel means for facilitating automation of a shoemaking operation. The invention is herein illustrated by reference to an automatic leveling machine of the type disclosed in United States Letters Patent No. 1,011,301, granted December 12, 1911, in the name of Erastus E. Winkley, and incorporating certain improvements disclosed in United States Letters Patent No. 1,239,664, granted September 11, 1917, in the name of William C. Baxter, although it will be understood that in its more general and useful aspects the invention is not limited to use in machines of that particular type or to a machine for performing any particular shoemaking operation.

As disclosed in United States Letters Patent No. 2,960,703, granted November 22, 1960, in the name of A. S. Dorosz, and United States Letters Patent No. 2,850,749, granted September 9, 1958, in the name of A. S. Dorosz, automation of certain shoemaking operations has now been accomplished in a practical manner by the provision of pallets upon which lasts carrying shoes may be securely and accurately mounted and of a handling system for carrying the pallets from machine to machine for the performance of different successive operations upon the shoes.

Various features of the present invention will be recognized in a novel organization of means for controlling the transfer of shoe bearing pallets from the handling system to a machine for performing an operation upon the shoes and for returning the pallets to the handling system at the completion of the shoemaking operation. As herein shown, the pallets are movable along a conveyor to a transfer station which is adjacent to a machine, and transfer mechanism is provided for carrying each shoe bearing pallet from the transfer station into operative relation to the machine and for returning each pallet to the transfer station. Preferably, and as illustrated, the transfer mechanism comprises coupling means for positioning and holding each pallet in a predetermined position upon the transfer mechanism, control means operated by the coupling means for actuating the transfer mechanism to cause the shoe to be presented to the machine, and a second control means operated by the transfer mechanism upon its return to the transfer station for actuating the coupling means to release the pallet from the transfer mechanism for delivery from the transfer station.

For performing the shoe bottom leveling operation the machine herein illustrated is a twin machine having two operating stations and, in accordance with a further feature of the invention, the work handling apparatus is arranged to deliver shoes in groups to and from the machine automatically. As shown, the conveyor is provided with a transfer station adjacent to each operating station of the machine and the pallets are carried into the transfer stations under the control of holdback means associated with the conveyor behind the transfer stations. Preferably, and as illustrated, there are associated with the conveyor devices for stopping and positioning all the pallets of a group to be presented to the machine, control means operated by all of the stopping and positioning devices for initiating a cycle of operation of mechanism for presenting the shoe bearing pallets to the machine and for returning the pallets to the transfer stations, a second control means actuated by the last-named mechanism upon the return of the pallets to the transfer stations for rendering the stopping and positioning devices inoperative whereby the pallets are released for movement away from the transfer stations, and a third control means which is actuated by the last pallet of each group upon its departure from its associated transfer station to operate the holdback means to release the succeeding group of pallets for movement into the transfer stations.

For the leveling operation, it is desirable that the toe of each shoe be located in the same lengthwise and heightwise position in the machine. In the construction herein disclosed, the mechanism for presenting shoe bearing pallets to the machine and for returning them to the transfer stations includes a carrier for each pallet and two fluid motors for effecting the movements of the carriers. The lengthwise position of each shoe when in work treating position in the machine is determined and controlled by a toe gage which, upon being displaced by the toe end of a shoe approaching the work treating station, interrupts operation of the fluid motor for operating its associated carrier. In order that the toe end of the shoe will be brought to the same heightwise position, the illustrated carrier is of extensible construction and there is provided novel means for imparting heightwise movement to the pallet progressively with the lengthwise movement to bring the toe of the shoe into engagement with the toe gage. Thus, for a small shoe, there will be considerable lengthwise movement required to bring the toe of the shoe into engagement with the toe gage and also considerable heightwise movement imparted to the pallet to compensate for the relatively small last height to the small shoe. Conversely, there will be relatively little lengthwise and heightwise movements imparted to a pallet carrying a large shoe having a large last height.

In the machine herein shown, each shoe is jacked or locked with respect to its associated pallet and carrier by means of a toe pad located initially below the toe end of the shoe and arranged to be raised by means of a hydraulic motor, a pressure sensitive switch being provided for each motor to lock it when the desired locking pressure has been obtained. When the pressure sensitive switches are closed, means are provided, as shown, for initiating operation of the machine. The leveling cycle is carried out in substantially the same manner as is disclosed in the above-mentioned Winkley and Baxter patents except that the extents of the lengthwise swinging movements of the composite shoe supports are varied in accordance with variations in size of the shoes carried by the shoe supports. For this purpose, there is provided between each composite shoe support and cam operated means for swinging the shoe support, pantograph mechanism which is automatically adjusted and set in response to the movement of the carrier to bring each shoe into a treating station. Since the extent of movement of the carrier in bringing shoes of different sizes into the treating station varies, the output throw of the pantograph mechanism will be varied in accordance with variations in sizes of different shoes so that the proper amplitude of movement will be imparted to the shoe support for each size of shoe being treated.

The above and other features of the invention including various novel details of construction and combinations of parts will now be more particularly described with reference to the accompanying drawings and pointed out in the claims.

In the drawings,
FIG. 1 is a side elevation showing an automatic leveling machine associated with work handling apparatus for automatically presenting shoes carried on pallets thereto;

FIG. 5 is a section also taken along the line IV—IV of FIG. 2 but showing shoe support control mechanism;

FIG. 6 is a vertical section on an enlarged scale showing a portion of the shoe support mechanism seen in FIG. 4 with certain parts broken away and others shown in section;

FIG. 7 is a section taken on the line VII—VII of FIG. 6;

FIG. 8 is a section taken on the line VIII—VIII of FIG. 6 with certain portions broken away;

FIG. 9 is a rear elevation on an enlarged scale of toe support structure seen in FIG. 4;

FIG. 10 is a view in side elevation of the toe and cone support mechanism with certain portions in section;

FIG. 11 is a section taken on the line XI—XI of FIG. 10 at an enlarged scale;

FIG. 12 is a view partly in section on a further enlarged scale of the cone support locking means;

FIG. 18 is a view similar to FIG. 15 with certain parts broken away and in section to show pallet locking mechanism;

FIG. 19 is a view similar to FIG. 15 showing the construction of the pallet receiving portion of the right-hand shoe support structure;

FIG. 20 is a section taken on the line XX—XX of FIG. 18;

FIG. 21 is a perspective view showing surfaces used in locking a pallet;

FIG. 22 is a plan view of a pallet used in the work handling apparatus;

FIG. 23 is a view in rear elevation of the pallet with parts broken away;

FIG. 24 is a view in side elevation of the pallet and the driving means therefor;

FIG. 25 is a section taken on the line XXV—XXV of FIG. 24;

FIG. 26 is an enlarged plan view of mechanism seen in FIG. 2 for holding back pallets from the leveling machine;

FIG. 27 is a section taken on the line XXVII—XXVII of FIG. 26;

FIG. 28 is a section taken on the line XXVIII—XXVIII of FIG. 26;

FIG. 32 is a section on an enlarged scale taken on the line XXXII—XXXII of FIG. 2;

FIG. 33 is a view similar to FIG. 32 showing various parts in alternate operating positions;

FIG. 36 is a plan view on an enlarged scale of a device, seen in FIG. 2, for indicating that the handling system is not free for discharge of pallets from the leveling machine;

FIG. 37 is a section taken on the line XXXVII—XXXVII of FIG. 36;

FIG. 38 is a plan view on an enlarged scale of sensing mechanism, seen in FIG. 2, which is actuated by passage of a pallet;

FIG. 39 is a section taken on the line XXXIX—XXXIX of FIG. 38; and

FIGS. 40, 41, 42 and 43 together diagrammatically depict the electrical and hydraulic circuits of the leveling machine and asociated work handling apparatus.

As noted above, the present invention is not directed primarily to improvements in leveling machine operation but is more particularly aimed at the provision of means for the automation of existing leveling machines as well as other shoe treating machines having equivalent requirements for automation. However, certain improvements now to be described do have advantages in the operation of leveling machines generally.

Figure 1:
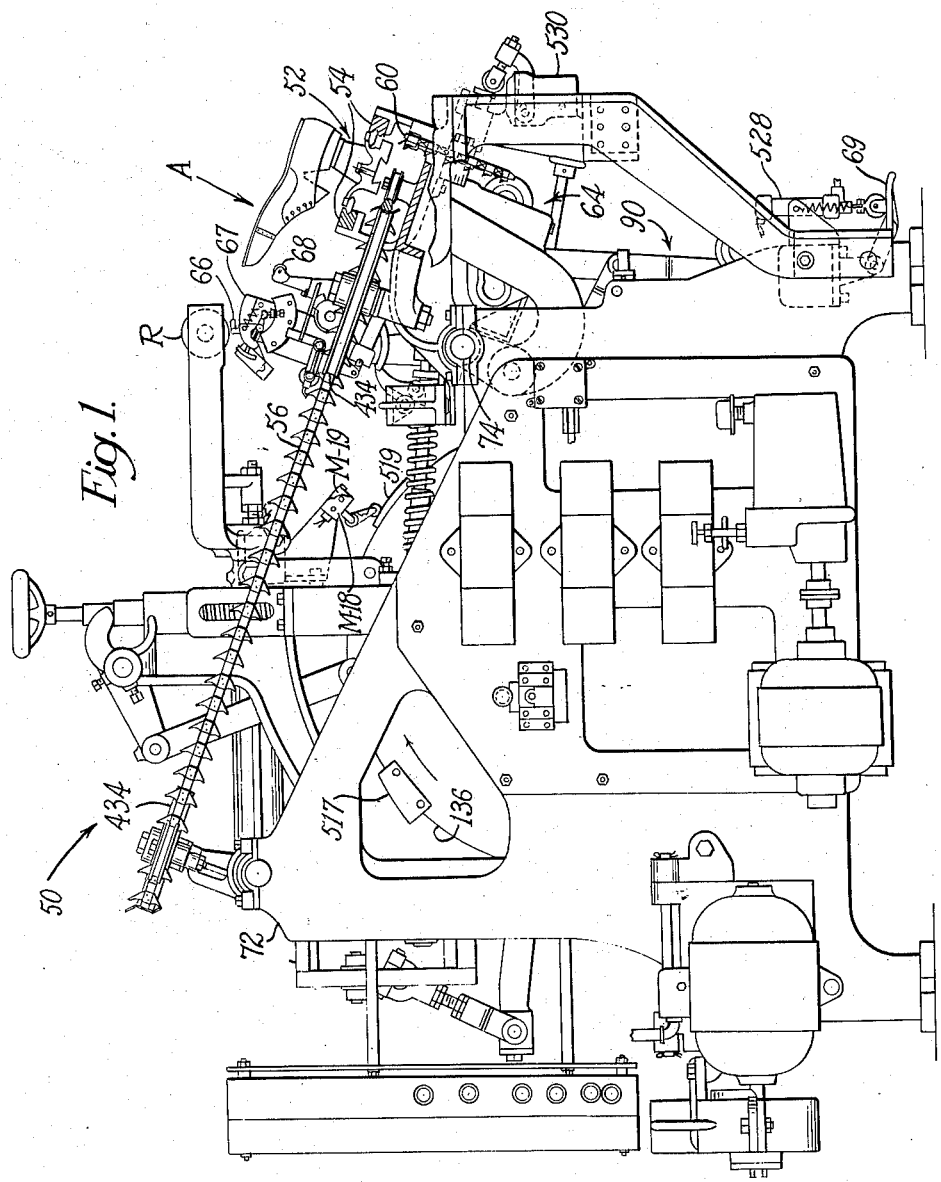
Figure 2:
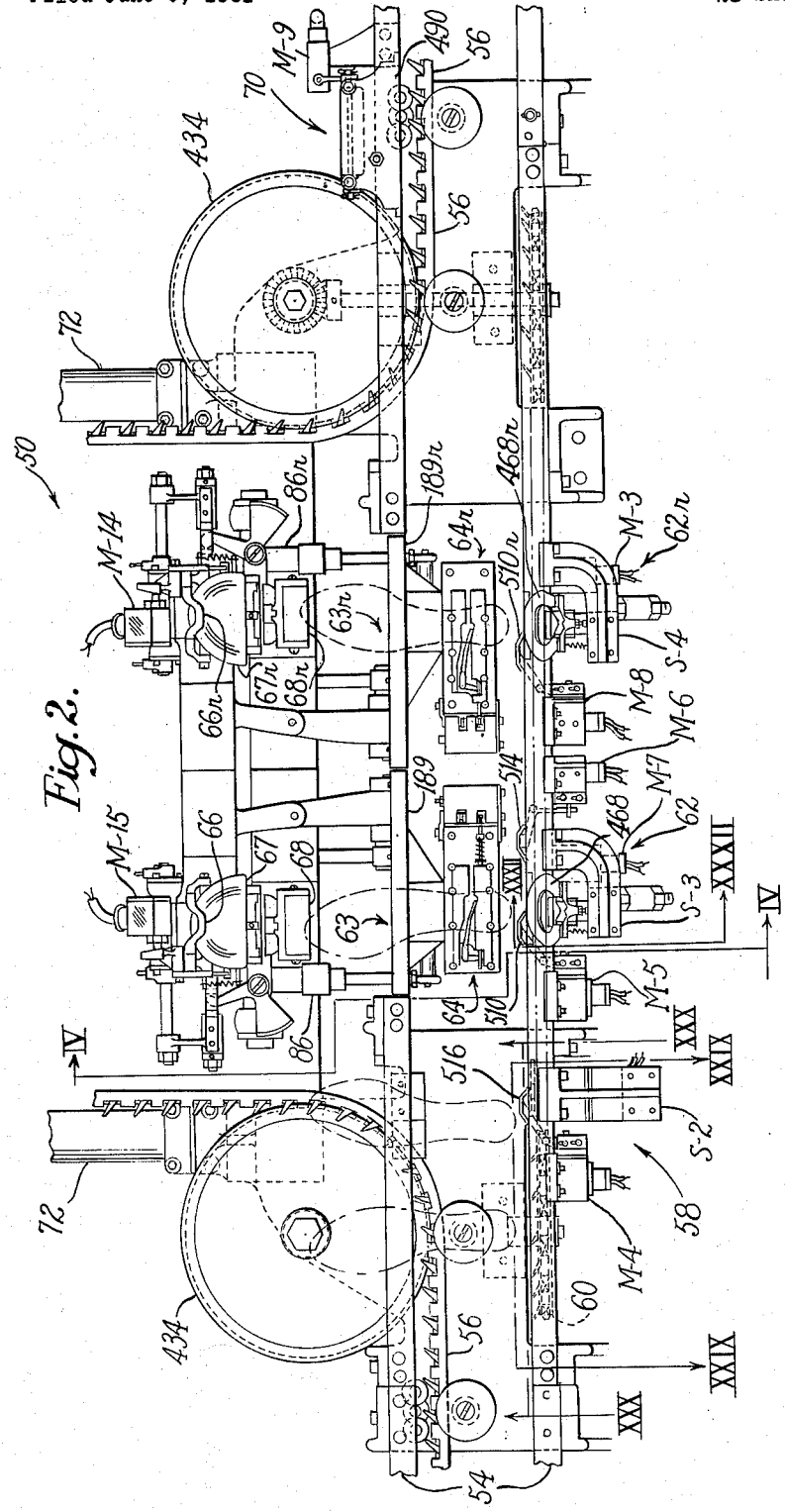
FIG. 2 is a view looking in the direction of the arrow A in FIG. 1.

Referering to FIG. 1, a leveling machine 50 will be seen. This machine, including its mode of operation, is essentially the same as that disclosed in the mentioned Winkley and Baxter patents. The basic purpose of this machine, as is well known, is to level the bottom of an outsole as one of the final steps in the manufacture of a shoe. This leveling operation is accomplished by imparting a series of relative movements between a roll R and a shoe bottom, lengthwise of the shoe, while exerting pressure through the roll R against the shoe bottom and imparting lateral tipping movements to the roll R during various portions of the lengthwise movement. The machine 50 is an automatic machine in that the operator does not control its various elements once the cycle of operation is started. The machine 50 is also a two-station machine, as indicated in FIG. 2, in which a pair of shoes are treated simultaneously. In the following description of the machine many coresponding left and right-hand elements will be found due to this two-station construction. For brevity of description, only the left-hand components will be described in detail, but where it is necessary to describe right-hand components the suffix $r$ will be employed with the corresponding reference character indicating a left-hand component.

Figure 3:
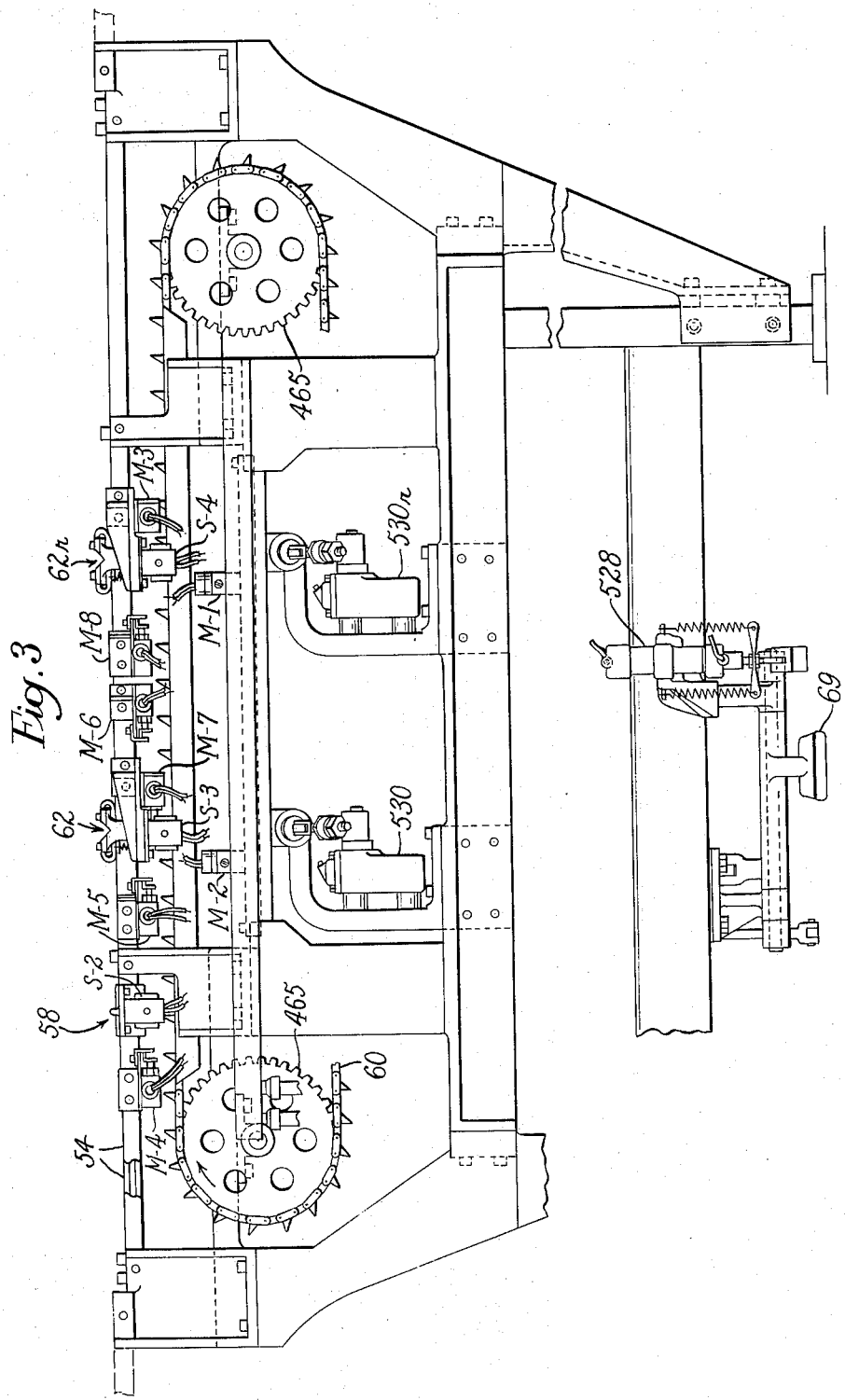
FIG. 3 is a front elevation showing portions of the work handling apparatus and the machine seen in FIG. 1.

Referring now to FIGS. 1 and 2, the general arrangement of the various components of the leveling machine 50 and their relation to the automatic work handling apparatus for delivering shoes to the machine may be seen. The shoes, assembled on lasts, are mounted on pallets 52, 52r (FIGS. 22 and 26) which distinguish left and right-hand lasts, respectively. Pallets 52r, 52, in pairs, approach the left-hand end of the leveling machine 50 on rails 54 along which the pallets are driven by a lugged belt 56 from a preceding station. Assuming that the leveling machine 50 is treating shoes when a pallet 52r approaches the leveling machine, such pallet will be stopped at a hold-back station 58 and disengaged from the belt 56. Each succeeding pallet will likewise be halted and disengaged from the belt 56 upon engaging the pallet ahead of it. It should be understood that the pallets 52, 52r are alternately arranged along the work handling apparatus. Upon completion of treatment of a pair of shoes by the leveling machine 50 such shoes, carried by other pallets 52, 52r, are discharged from the machine 50 along a further portion of the work handling apparatus at the right or discharge side of said machine. Thereupon, the next pair of pallets 52r, 52 are released from the hold-back station 58, and are moved by an auxiliary lugged belt 60 (FIGS. 1 and 3) into right and left transfer stations where they are coupled to the leveling machine 50. Control means, including cam plates 510, 510r which are selectively operated by the pallets, are provided for energizing positioning devices 62, 62r which locate the pallets 52, 52r, at transfer stations 63, 63r respectively, and simultaneously cause the pallets to be disengaged from the belt 60. Automatic controls thereafter cause the pallets 52, 52r to be locked on carriers 64, 64r which then transfer the pallet-borne shoes away from the transfer stations 63, 63r to predetermined positions with respect to the machine 50. From the detailed description below it will be apparent that the carriers 64, 64r, together with the pallets 52, 52r respectively, form supports for the heel ends of lasted shoes.

The positioning of the shoes with respect to the machine is controlled by independently operating toe gages 66, 66r. Engagement of the shoes with said toe gages, through further automatic controls, causes the shoes to be locked or jacked by raising toe pads 67, 67r, at which time the carriers 64, 64r are independently locked with respect to the toe pads. The intermediate portions of the lasts are supported by cone supports 68, 68r at this time. Each shoe is thus locked upon a composite shoe support or jack comprising the toe pad 67, the cone support 68, the carrier 64 and the pallet 52. Each jack is then carried through a series of movements beneath a roll R, in the manner described in the above-mentioned Baxter patent, after other automatic means depress a treadle 69 to initiate a cycle of operation of the machine 50. By providing independent operation of the toe gages 66, 66r it is possible simultaneously to level different sizes of shoes, since the amplitude of motion imparted to each jack in the operation of the machine 50 is dependent upon the extent of inward movement of the carrier as regulated by the respective toe gage.

Upon completion of operation of the machine 50 the toe pads 67, 67r and the cone supports 68, 68r are moved downwardly as the carriers 64, 64r return the pallets 52, 52r to the transfer stations 63, 63r. Normally, the positioning devices 62, 62r are then deenergized and cause the pallets 52, 52r to be engaged with the auxiliary belt 60 which carries them toward the right of the work handling apparatus into the path of the belt 56. The latter belt now propels the pallets to other work treating machines.

If there already are pallets 52, 52r immediately adjacent the discharge side of the machine 50, a pile-up indicator 70 senses such condition and causes the positioning devices 62, 62r to remain energized and to hold the pallets last presented to the machine at the transfer stations 63, 63r so long as this condition exists. As soon as the piled-up pallets pass out of the field of the indicator 70, the devices 62, 62r are deenergized and the pallets 52, 52r at the transfer stations are released therefrom and reengaged with the belt 60, whereupon other sensing means 514, actuated by the left pallet only in its departure from its transfer station, causes the release of the next pair of pallets 52, 52r from the hold-back station 58.

General Operation of Leveling Machine Jack

As mentioned above, the leveling machine 50 is generally similar to that disclosed in the above-mentioned Baxter patent. The machine comprises a pair of side frames 72 between which a shaft 74 extends. On this shaft, as in the above-mentioned Baxter patent, the dual shoe supporting structures or jacks are journaled. Each jack comprises the toe pad 67 and cone support 68 which are carried on a post 80 (FIGS. 4 and 5), and the carrier 64 which is pivoted at 82 to an arm 84 formed integrally with the post 80. The post 80 and the carrier 64 are interconnected by a fluid motor 86 which is the power source for moving said carrier away from the transfer station 63. As indicated above, the movement of the carrier 64 is limited by engagement of the toe of a shoe with the toe gage 66 which in turn causes interruption of flow of fluid to the motor 86. As the toe of each shoe is always brought to the same points as indicated by the toe gage 66, the final position of the carrier 64 indicates the length of the shoe. A linkage arrangement automatically adjusts a pantograph system 90 (FIG. 5) which, in turn, through means which are more fully described in the mentioned Baxter patent, establishes the proper magnitude of relative movement which will be imparted between the shoe bottom and the roll R. More particularly, this linkage comprises a bracket 92 fastened to a lug extending from the rear of the carrier 64 to which a link 94 is pivotally attached. The upper end of the link 94 is pivotally connected to an arm 96 which in turn is journaled on a pin 98 extending between lugs 100 formed on the post 80. An arm 102 integral with the arm 96 is pivotally connected at its lower end to a bracket 104 which threadedly receives a rod 106 journaled in a bracket 108, collars 110 being fixed upon the rod to prevent relative axial movement between the rod 106 and the bracket 108. The bracket 108 has an upwardly extending arm which is pivotally connected to a link 112 which carries at its upper and lower ends rolls 114. The link 112 is pivotally connected to another link 116 which is pivoted to a fixed bracket 118. The lower roll 114 rides in an arcuate slot 120 formed in an arm 122. The upper roll 114 rides in an arcuate slot 124 formed in an arm 126 which is integral with a second arm 128, journaled on the shaft 74. The arm 128 is connected to the post 80 by a pin 130, as shown in FIG. 9. The arm 128 may be disconnected from the post 80 by moving a lever 131 to displace the pin 130. Corresponding parts are provided for the right-hand jack of the machine, there being a second arm 122r which, with the arm 122, are integrally joined to a lever arm 132 which is pivoted about an eccentrically mounted shaft 134, the eccentric being provided to accommodate manufacturing tolerances.

The arm 132 is connected to cam controlled mechanism which includes a master cam mounted on a carrier 136 (FIG. 1) which rotates one revolution each time the machine is cycled, thereby imparting pivotal motion to the arm 132 in the manner described in the aforementioned Baxter patent. With such movement of the arm 132, it acts through the link 112 to cause pivotal movement of the arm 128, the post 80, and therewith the entire jack, thus imparting lengthwise movements to the shoe relatively to the leveling roll. It will be appreciated that by changing the angular setting of the link 112 the desired extent of movement of the arm 128 and the associated jack can be obtained. As the carriers 64 and 64r are mounted independently of each other, it is possible for the links 112, 112r to be set at different angles thereby permitting two shoes of different sizes to be properly leveled during the same cycle of operation of the machine.

As in the Baxter machine, the rod 106 may be manually adjusted by a hand wheel 138 to effect a setting of the link 112 according to the required length of relative movement between the roll R and the shoe bottom.

Pallet Carrier

The carrier 64 is arranged to transfer pallets 52 into the machine 50 so that only is the toe of each shoe located at a fixed point as determined by the toe gage 66, but the sole of each shoe will lie in substantially the same plane regardless of its size. To this end, a composite construction of the carrier 64 is provided which will progressively raise the pallet and shoe as it moves inwardly. Thus, smaller sizes in which the last height is also small are raised proportionately more to bring their soles into the desired plane since the carrier movement required to bring the toe end of the shoe into engagement with the gage 66 is greater than with large sizes.

The construction for attaining this end (FIGS. 4, 6–8) comprises a J-shaped hollow frame 140 pivotally connected to the arm 84 at 82. A shaft 142 is slidably mounted in the frame 140 and carries at its upper end a pallet receiving base 144. To this shaft and base the desired composite motion is imparted. A bracket 146 is secured to the arm 84 and carries at its outer end an adjustable link 148 which is connected to a cam plate 150, the latter being mounted for vertical movement in guideways 152 secured to an inner wall of the frame 140 by screws 154. The cam plate has formed therein a cam slot 156 which receives a roll 158 mounted on one end of a bell crank 160 the other end of which enters a slot 162 formed in the shaft 142. The bell crank 160 is pivotally mounted on a pin 164 which is secured to an eccentric bushing 166 by a nut 168. An arm 170 (FIG. 8), integral with the eccentric bushing 166, is provided with a spring-biased detent 172 which is adapted to enter any one of a series of holes 174 to establish the proper setting of the bell crank 160 for a purpose to appear later. Upon the inner side of the frame 140 there is fixed a cover 176 in which the holes 174 are formed and the bushing 166 is rotatably mounted. A piston rod 177 of the fluid motor 86 is pivotally connected to a lug 178 extending from the frame 140.

Figure 16:
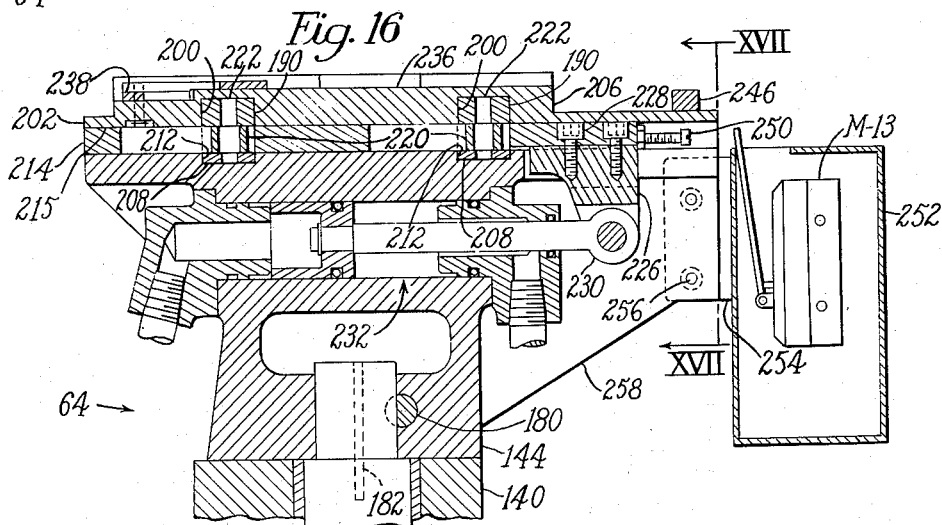
FIG. 16 is a section taken on the line XVI—XVI of FIG. 15.
Figure 17:
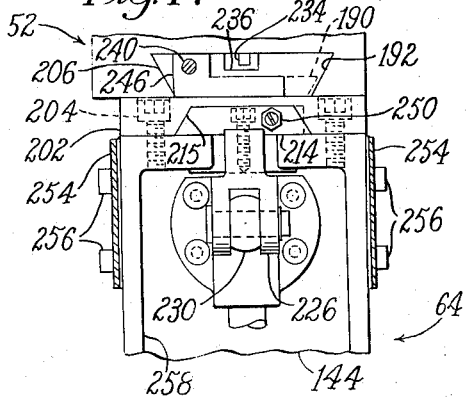
FIG. 17 is a section taken on the line XVII—XVII of FIG. 16.

The pallet receiving base 144 is secured to the upper end of the shaft 142 by a binding screw 180 (FIGS. 6 and 16). A key 182 is provided to maintain a fixed angular relationship between the base 144 and the shaft 142. Another key 184 extending upwardly from a frame cap 185 enters a slot 186 formed in the base 144 to maintain proper angular alinement between the base 144 and the frame 140. This arrangement also eliminates any possibility of jamming the bell crank 160. The cap 185 is secured between a wall of the frame 140 and the cover 176 by screws 187.

Extending from each pallet receiving base 144 is a bracket 188 (FIG. 4) on which is formed a rail portion 189. The rail portions 189 (FIGS. 2 and 4) form continuations of the inner rail 54 at the transfer stations 63, 63r. In order that pallets may pass smoothly through the transfer stations 63, 63r it is necessary that the rail portions 189, 189r be properly alined with the inner rail 54. Transverse alinement is obtained by control of the position in which the base 144 is locked on the shaft 142 by the binding screw 180 (FIG. 6). Heightwise alinement is obtained by manipulation of the arm 170 to adjust the initial heightwise position of the bell crank 160 and therewith the heightwise position of the shaft 142 and the base 144. Alinement of the rail portion 189r is obtained in a similar manner.

*Pallet Locking Mechanism*

Referring now to FIGS. 15 through 21, the arrangement of parts for locking a pallet 52 on the carrier 64 may be seen. The locking mechanism is actuated after the pallet is located by the positioning device 62 and is disengaged from driving relation with the belt 60. These parts are mounted on the pallet receiving base 144. Locking of a pallet 52 is primarily accomplished by lugs 190 having locking surfaces 191 which are forced against matching surfaces of a dovetail slot 192 formed in the pallet 52 (FIGS. 18, 20 and 21). Other surfaces 193 formed on members 194 act as further centering means for positively locating the pallet 52 and also positively preventing sidewise displacement of the pallet 52 as a shoe is being treated by the leveling roll R. The members 194 are secured to the lugs 190 by screws 196 and are positioned thereon by a tongue-and-groove arrangement 198. The lugs 190 are normally in their inoperative or retracted position, as shown in FIGS. 18 and 20, being slidably mounted in slots 200 formed in a member 202 which is secured to the base 144 by screws 204. The member 202 is formed with a dovetail 206 corresponding to the dovetail slot in the pallet 52 for locating each pallet longitudinally of the transfer station 63 as well as to assist in locking the pallets on the carrier 64.

The following arrangement is provided to bring the lugs 190 into their operative or locking positions. A plate 208 is secured to each lug 190 by screws 210. The plates 208 ride in slots 212 formed in the base 144. A cam plate 214 riding in a guideway 215 in the member 202 extends through slotted openings 216 in the lugs 190. The cam plate 214 is provided with two cam slots 218 within which ride rolls 220 carried by pins 222 extending between the lugs 190 and the plates 208. The cam plate 214 is provided with various clearance cuts 224, as illustrated in FIG. 18, to allow for transverse movement of the lugs 190. From the above description it will be apparent that as the cam plate 214 is displaced toward the right, the lugs 190 will be displaced transversely of the pallet receiving base 144, causing the surfaces 193 to engage the ends of the pallet 52, thereby centering the pallet as well as locking it against movement along the dovetail 206. Continued motion of the cam plate 214 will cause the surfaces 191 to engage the edge of the slot 192 thereby locking the pallet in a positive manner.

Referring to FIG. 19, the right-hand pallet receiving structure may be seen. The mode of operation of this structure is identical with that of the left-hand structure above described with the exception that the cam plate 214r is adapted to cause locking of a right-hand pallet 52r by movement of the cam plate toward the left.

Movement is imparted to the cam plate 214 through the following mechanism. A bifurcated lug 226 (FIG. 16) is secured to the cam plate 214 by screws 228 and carries at its lower end a piston rod 230 which extends from a hydraulic motor 232. The motor 232 is actuated in a manner described below alternately to displace the piston rod 230 between right and left-hand positions in which the lugs 190 are in locking and inoperative positions, respectively. With the exception that the fluid motor 232 is formed as an integral part of the base 144, it is of conventional construction for a double acting type motor.

Associated with the pallet receiving structure are safety means for insuring that there is a lasted shoe properly assembled on each pallet 52 and that the pallet is centered and locked upon the receiving structure before the machine 50 is cycled. The presence at the transfer station 63 of a lasted shoe fully assembled upon the pallet 52 is indicated by a sensing rod 234 (see FIGS. 22–25) which is displaced by the last so as to project from the pallet into the dovetail slot 192. This rod now extends into a slotted recess 236 formed in the top of the guide 206. How the rod 234 is mounted in the pallet 52 is explained below in a complete description of it. Near the end of the movement of a pallet 52 into the transfer station a bell crank lever 238 (FIG. 15) is rotated by the sensing rod 234 in a counterclockwise direction (FIG. 15) causing displacement of a rod 240 toward the right and closure of a microswitch M–10. The rod 240 is slidable in the guide 206 and is normally biased toward the position seen in FIG. 15 by a spring 242 compressed between a collar 244 fixed upon the rod and a bracket 246 mounted upon the member 202. A screw 248 is threadedly carried on the end of the rod 240 to provide an adjustment for the effective length of the rod 240.

The construction of the corresponding right-hand structure (FIG. 19) is essentially the same with the exception of modifications which are necessary to accommodate mounting of a switch M–11 on the left-hand side of the pallet receiving base 144r. The switch M–11 is of the so-called normally closed construction; but the rod 240r normally maintains the switch M–11 open. Thus, when the bell crank lever 238r is rotated in a counterclockwise direction by a sensing rod 234r, corresponding to the sensing rod 234, the rod 240r is displaced toward the right against the action of the spring 242r, allowing the switch M–11 to assume its normally closed position and to complete a circuit indicating the presence at the transfer station 63r of a lasted shoe fully assembled upon the pallet 52r.

Means are also provided for indicating that a pallet 52 has been properly locked by the surfaces 191, 193. These means include a screw 250 (FIG. 16) which is adjustably locked on the right-hand end of the cam plate 214. This screw is adapted to close a normally open switch M–13 to indicate that a pallet 52 is properly locked. A similar arrangement is provided on the right-hand structure (FIG. 19) to indicate that a pallet 52r is properly locked. This arrangement includes a screw 250r which is adapted to close a normally open switch M-12. The switches M-10, M-13 are mounted in a box 252 (FIGS. 15 and 16) which is secured by plates 254 and screws 256 to webs 258 extending from the base 144. A similar arrangement is provided for mounting the switches M-11, M-12.

Toe Support Structure

The toe support structure comprises the rubber toe pad 67 (FIG. 10) which is carried by a block 264 slidably mounted for arcuate movement in plates 266 which are secured to a bifurcated member 268 (FIGS. 9, 10 and 11) by screws 270. The bifurcated member 268 is carried for vertical movement by an upwardly extending guide 272 which is secured to the post 80 by clamping bars 274 and screws 276. In this manner the rubber pad 260 is carried with the post 80.

Figure 13:
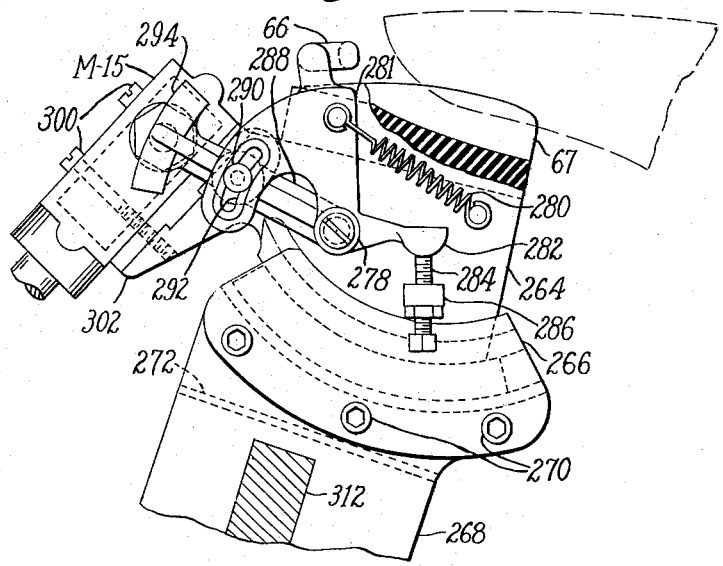
FIG. 13 is a side elevation partly in section showing the toe support and toe gage.
Figure 14:
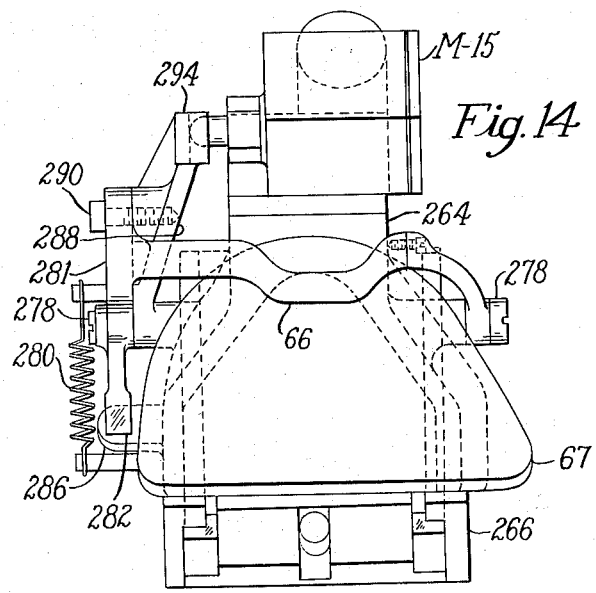
FIG. 14 is a plan view of the elements seen in FIG. 13.
Figure 15:
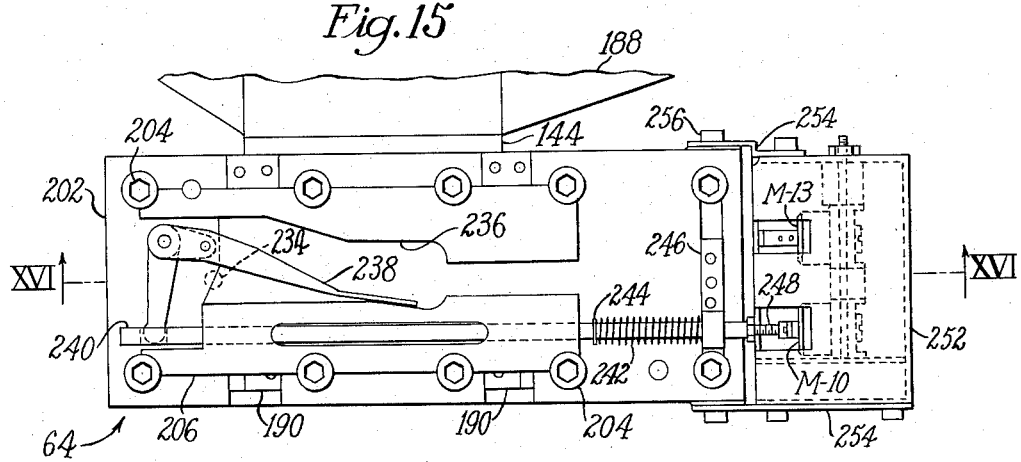
FIG. 15 is a plan view on an enlarged scale of the pallet receiving portion of the shoe support structure seen in FIGS. 2 and 4.

As mentioned above, the fluid motor 86 pulls the carrier 64 toward the post 80 to bring the toe end of the shoe to a predetermined point with respect to the machine, as determined by the toe gage 66. The toe gage 66 is pivotally mounted on shoulder screws 278 (FIGS. 13 and 14) which extend from the block 264. A spring 280 extending between a side flange 281 of the toe gage 66 and the block 264 tends to maintain the toe gage 66 in a position limited by an integral arm 282 which engages an adjustable stop screw 284 threaded into a lug 286 extending from one side of the block 264. A second arm 288 pivots about one of the screws 278 and is adjustably secured to the side flange 281 by a screw 290 which passes through a slot 292 formed therein. At the outer end of the arm 288 a cam 294 is provided for closing a normally open microswitch M-15 when the toe gage 66 is displaced by the toe end of a shoe as it is brought into the desired position by the carrier 64. Screws 300 secure the microswitch M-15 to a bracket 302 which extends from the block 264.

The functional operation of the toe gage is more fully explained below. However, briefly, as the carrier 64 approaches the post 80, the toe end of the shoe engages the toe gage 66 causing the switch M-15 to be closed, the flow of fluid to and from the fluid motor 86 to be stopped and the carrier 64 to be locked relatively to the post 80. To accommodate various styles of toes and to assure that the toe each time is brought to a predetermined position with respect to the toe gage, the angular relationship between the cam 294 and the toe gage 66 may be varied by adjusting the screw 290 within the scope of the slot 292. Further adjustment is provided by the screw 284. The arrangement of parts on the right-hand toe gage corresponds to that above described, with the exception that the corresponding microswitch is designated M-14 rather than M-15, which will be brought forth more fully in the detail description of the electrical control system which follows.

When the toe end of the shoe is properly positioned with respect to the machine, as determined by the toe gage 66, the toe pad 67 is raised upwardly to jack or lock the shoe. The heel end of the shoe last being securely fastened on the pallet 52 which is locked on the carrier 64, the actual locking of the shoe and last is accomplished by this upward motion of the pad 67. A double acting hydraulic motor 304 (FIGS. 9-11) of conventional construction formed on an extension of the guide 272 provides power for raising the toe pad 67. The motor 304 includes a piston rod 306 attached to which is one end of an arm 308 the other end of which is secured to a rod 310 extending from a wedge 312. The wedge 312 engages matching surfaces formed in openings 314 in the bifurcated portion of the member 268 and passes through a clearance slot 316 formed in the guide 272. Referring to FIGS. 9 and 10, it will be apparent that as the hydraulic motor 304 is actuated to move the piston rod 306 and wedge 312 to the left (FIG. 9), the toe pad 67 will be raised upwardly into engagement with the shoe to lock the last upon the jack in readiness for initiation of the leveling cycle.

Cone Support Mechanism

The cone support 68 is in the form of a resilient roll mounted at the upper end of a post 320 which is slidably mounted in a housing 324 secured to the post 80 by screws 326. A spring 328 at all times urges the cone support 318 in an upward direction. However, prior to locking of the shoe by raising the toe pad 67 in the manner described above, the effect of the spring 328 is overcome by the following mechanism which maintains the cone support in the position shown in FIG. 10. A rack 330 formed on the post 320 meshes with a pinion 332 which is integral with a shaft 334 journaled in the housing 324. A tongued plate 336 (FIG. 11) is secured to the upper end of the housing 324 by screws 338 with its tongue portion engaging a corresponding groove 340 formed in the post 320 to maintain proper alinement between the rack 330 and the pinion 332. A bevel gear segment 342 is pinned to the outer end of the shaft 334 and meshes with a corresponding segment 344 formed on one end of a bell crank lever 346 which is pivotally mounted on an extension of the housing 324 by a screw 347. The other end of the bell crank 346 is formed with a finger 348 which engages an abutment 350 adjustably secured to a toothed member 352 (FIG. 9) by a screw 354. The member 352 in turn is secured to the end of the link 308 adjacent the rod 310 by screws 356. Thus, when the wedge 312 is in its outer position (FIGS. 9 and 10) the bell crank 346 is maintained in the position shown in FIG. 11 by engagement of the finger 348 with the abutment 350. The segment 342 is maintained in the position shown in FIG. 10, thereby maintaining the cone support post 320 and the cone support 68 in a retracted position against the action of the spring 328. When a shoe has been brought into position to engage the toe gage 66, thereby causing the wedge 312 to move inwardly (toward the right, FIG. 11), the cone support 318 moves upwardly under the action of the spring 328 yieldably to engage the intermediate portion of the shoe last adjacent the cone area. By holding the cone support in a retracted position during jacking of the shoe, interference between the cone support and the shoe during the jacking operation, as well as during movement of the shoe along the rails into the transfer stations 63, 63r (FIG. 2) is avoided.

The cone support 318 is moved slightly beyond the position to which the spring moves it and is locked in its supporting position through the following arrangement, which is more fully described in United States Letters Patent No. 2,104,739, granted January 11, 1938, on an applicaiton filed in the names of Andrew Eppler and James P. Fredericksen. For this purpose, a ratchet wheel 358 (FIG. 12) is keyed to the shaft 334. A sleeve 360 is adjustably secured to the housing 324 by a screw 362 and partially surrounds the wheel 358. Rotatably mounted on a reduced diameter of the sleeve 360 is a pawl carrier 364 in which a pawl 366 is resiliently mounted. Normally the pawl 366 rides against the outer surface of the sleeve 360, as seen in FIG. 12, so that the primary movements of the shaft 334 are controlled by the spring 328 and the abutment 350. The lower end of the pawl carrier 364 is connected by a curved link 368 to an arm 370 (FIG. 10) which is pivotally mounted on the pin 98. Upon completion of the locking of the shoe by upward movement of the toe pad 67, the jack is swung in a counterclockwise direction (FIG. 10) in the manner described above. As this swinging movement is initiated, the arm 370 is swung in a clockwise direction (with respect to the shaft 98) by engagement with a roll 374 which is mounted in a fixed position on the frame 72. In this manner the pawl carrier 364 is rotated in a counterclockwise direction as the link 368 and the arm 370 form a toggle to lock the carrier in its rotated position. As the carrier 364 rotates, the pawl 366 enters an opening 376 in the sleeve 360 and during the final portion of its movement engages and imparts a small amount of rotation to the ratchet wheel 358 to force the cone support 318 firmly into engagement with the cone of the last and maintain it in that position during the leveling operation.

Shoe Pallet

Portions of the following description of the pallet 52, as well as various automatic means for controlling the movements of the pallet, do not form a part of the present invention except in so far as certain interrelated features are involved. However, for a full understanding of such features, a compelte description of a pallet 52, conforming to that of the pallet of United States Letters Ptaent No. 2,850,749, granted on September 9, 1958, in the name of Adolph S. Dorosz, and various associated control mechanism will be given in order to afford a complete understanding of the present invention.

In the operation of the present automatic system several pallets 52 and 52r are employed. One such pallet 52 is seen in FIGS. 22 through 25. It comprises a base 378 from which extend legs 380 on which wheels 382 are mounted. The wheels 382 are arranged to ride in the rails 54, as shown in FIGS. 26–28. A last pin 384 extends from the base 378 for receiving lasts as the last L. The last L is provided with a positioning plate 388 (FIGS. 24 and 25) of the type disclosed in United States Letters Patent No. 2,806,233, granted on September 17, 1957, in the names of A. R. Hubbard et al. The plate 388 is of asymmetrical configuration which identifies the last L as being left handed. For right-handed lasts the positioning plate 388r would be of the same configuration but inverted. The base 378 of the pallet 52 is provided with short and long lugs 385, 386. The short lug 385 is arranged to enter a recess 390 formed in the positioning plate 388 which will not receive the long lug 386, thereby permitting only the left last L to be fully assembled upon the pallet base 378. The lug 386 bears against the opposite side of the positioning plate 388. The lugs thus cooperate with positioning surfaces on the plate to establish the desired angular relationship of the last L with respect to the pallet 52. A similar but inverted arrangement of the lugs 385r, 386r on pallets 52r permit pallets 52r to carry only a right-hand last whereas the pallets 52 carry only left-hand lasts. A roll 389 mounted on the base 378 prevents the last from being fully assembled upon the pallet unless its positioning plate is substantially in register with the lugs, so that the sensing rod 234 cannot be operated by a last placed upon the pallet with its toe swung 90° from the proper position.

The sensing rod 234, mentioned above, is slidably monuted in the base 378 and is normally biased by a spring 400 into a position such that its upper end projects above the base 378 and its lower end is within the base. A spring clip 402 is secured to the base 378 and is arranged to enter a notch 404 formed in the plate 386 to hold the last down upon the pallet. When a last L is properly positioned against the upper surface of the base 378 the sensing rod 234 is depressed to the position shown in FIG. 24 and will actuate microswitches such as the microswitch M–10 described above.

Pallets move along the conveyor system toward the right, this direction being indicated in FIGS. 22 and 23 by the arrows. Pallets are initially driven up to the leveling machine 50 by the belt 56 which engages a driving finger 406 on the pallet carried at the end of a pin 408 pivotally mounted on one side of a bail 410. The bail 410 is secured to a shaft 412 pivotally mounted on the base 378. A torsion spring 414 acting between the bail 410 and the base 378 urges the driving finger 406 downwardly into the path of lugs 416 extending from the belt 56. A torsion spring 418 is provided to allow the driving finger to yield out of driving engagement with the lugs 416 in case there is a jam preventing movement of the pallet. The normal position of the finger 406 relative to the bail 410 is determined by the engagement of a pin 409, passing through the pin 408, with a stop 411 on the bail (FIG. 23).

Figure 30:
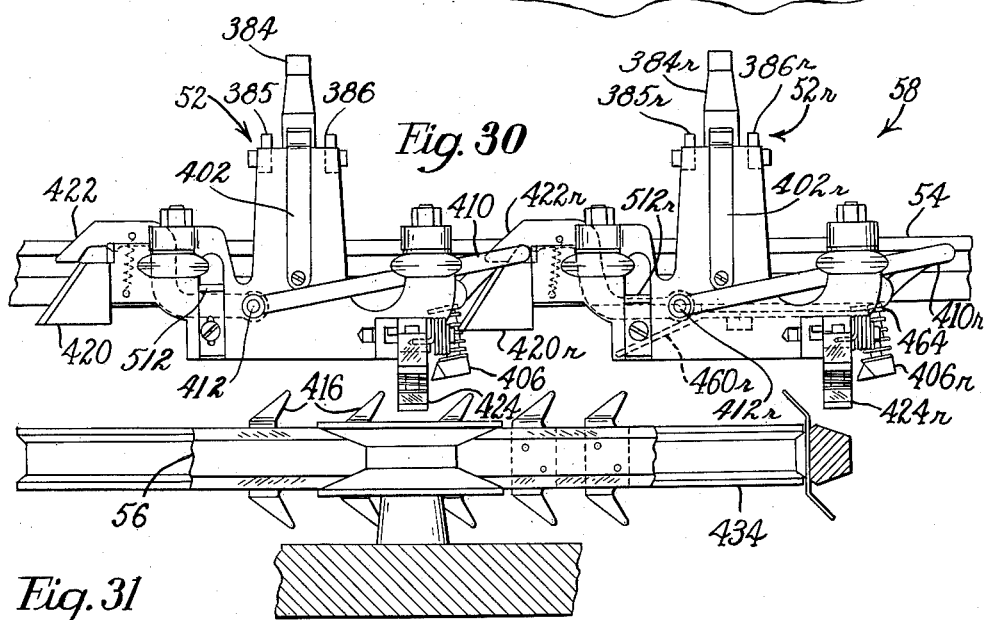
FIG. 30 is a section on an enlarged scale taken on the line XXX—XXX of FIG. 2 also showing two pallets in the handling system in the same relation as in FIG. 29.

At the trailing ends of the pallets 52, 52r there are cams 420, 420r which extend from the bases 378 into the path of movement of the bail 410 or 410r on the succeeding pallet. When any pallet is stopped, as at the hold-back station 58 (FIG. 30), the bail of each succeeding pallet engages the cam 420 of the pallet ahead thereby lifting the forward end of the bail and disengaging the lug 406 from the conveyor belt 56. Each pallet has a latch 422 for preventing the bail of a succeeding pallet from slipping off the cam 420 and thereby maintaining the succeeding pallet disengaged from the belt 56. The latch 422 is pivotally mounted on an intermediate portion of the shaft 412. A pin 423 extends from the shaft 412 through a slot 425 formed in the hub of the latch 422. When the bail 410 of any pallet is lowered, the pin 423 engages one end of the slot 425 thereby raising the latch 422 and releasing the bail of the succeeding pallet. When the bail 410 is raised, the latch 422 is pulled downwardly by a spring 427 against the cam 420 in readiness to hold the bail of a succeeding pallet.

A second driving finger 424 is arranged to engage lugs 426 extending from the auxiliary belt 60. The finger 424 is carried at the lower end of a pin 429 pivoted in an arm 428 which is in turn pivotally connected to the base 378 by a pin 431 and normally held in the position shown in FIG. 24 by a torsion spring 433. The finger is normally held properly oriented with respect to the arm 428 by a pin 432 carried by the pin 429 and resting in a notch in the upper surface of the arm 428 in which position it is yieldingly held by a spring 430 between the arm and the finger 424.

Hold-Back Station

At the hold-back station 58, indicated in FIG. 2 and more particularly illustrated in FIGS. 26 through 31, pallets are held in readiness for presentation to the leveling machine 50. The pallets approach the leveling machine 50 with their wheels 382 riding in the rails 54, being carried along by the lugged belt 56. Assuming that a pair of shoes is being treated by the leveling machine 50 as a pallet 52r reaches the hold-back station, that pallet will be stopped at the hold-back station 58, and each succeeding pallet will be stopped by the one ahead of it. In the vicinity of the hold-back station the pallets 52, 52r come within the field of action of the auxiliary belt 60 which drives the pallets into and out of the transfer stations, 63, 63r, the belt 56 being diverted around the rear of the machine 50 over pulleys 434 (FIGS. 1 and 2). Thus, at the hold-back station it is not only necessary positively to halt forward motion of the pallets but also to maintain the driving fingers 406 and 424 out of engagement with the lugs 416, 426, respectively, of the belts 56 and 60.

Figure 29:
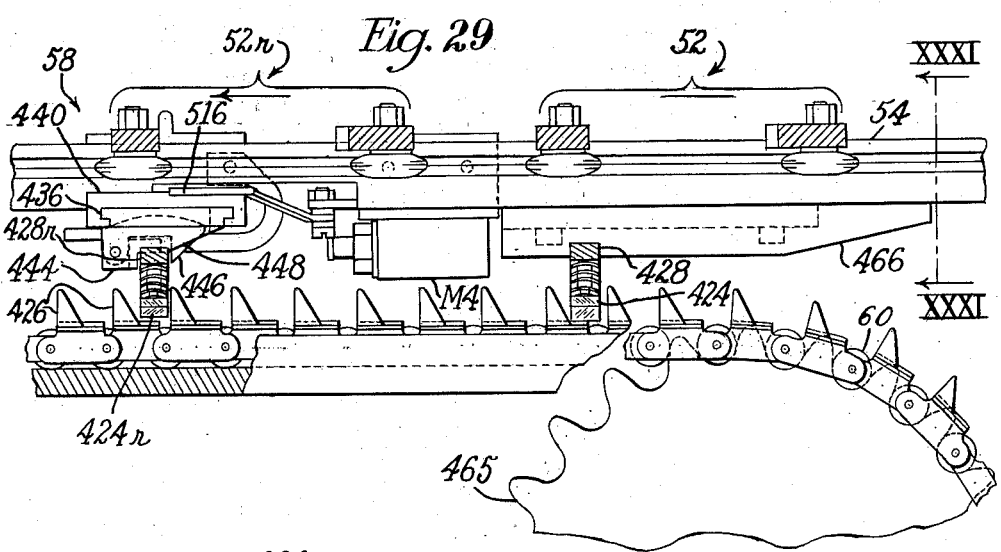
FIG. 29 is a section on an enlarged scale taken on the line XXIX—XXIX of FIG. 2 also showing portions of two pallets in the handling system.

Referring to FIGS. 26, 28 and 29, a pallet 52r is shown as arrested at the hold-back station 58. The holdback means comprise a slide 436 mounted in a bracket 440 which is attached to the outer rail 54 by screws 442. Formed on the slide 436 is an abutment 444 on which is pivoted a latch 446 for preventing rearward movement of the pallet 52r. As the pallet approaches the abutment 444, a sloping surface 448 on the slide 436 cams the arm 428r downwardly thereby disengaging the finger 424r from the belt 60 as the pallet moves into the holdback station 58. A spring 450 (FIG. 28) extending between a fixed bracket 452 and the slide 436 normally maintains said slide in its operative position. A solenoid S–2 arranged to move the slide into inoperative position against the action of the spring 450 is mounted on the bracket 440 with its armature connected by links 454 to the slide 436. Upon energizing the solenoid S-2, the slide 436 is retracted and the arm 428r swings upwardly under the action of the torsion spring 433r to return the finger 424r into driven relation to the belt 60, whereby the pallet 52r is driven toward the leveling machine 50.

The driving finger 406r of the pallet 52r shown at the hold-back station 58 will have passed out of the path of the driving lugs 416 of the belt 56 due to the fact that the belt 56 is directed toward the rear of the leveling machine 50 around one of the pulleys 434. At the point where a succeeding pallet 52 will engage an arrested pallet 52r, the belt 56 has not yet passed out of the normal path of the finger 406 of the pallet 52; but such finger is lifted out of driven relation to the belt because the bail 410 is raised by engagement with the cam 420r. As the pallet 52r approaches the hold-back station 58 its bail 410r is raised by a cam plate 460 which is fixed upon the inner rail 54. As a deflecting plate 464r (FIG. 27) on the bail slides along a rising slope on the left-hand end of the cam plate 460 the bail is lifted and the hook 422r is lowered into its operative position.

Figure 31:
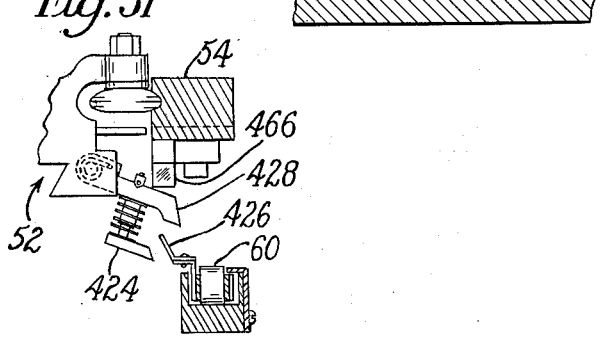
FIG. 31 is a section taken on the line XXXI—XXXI of FIG. 29.
Figure 34:
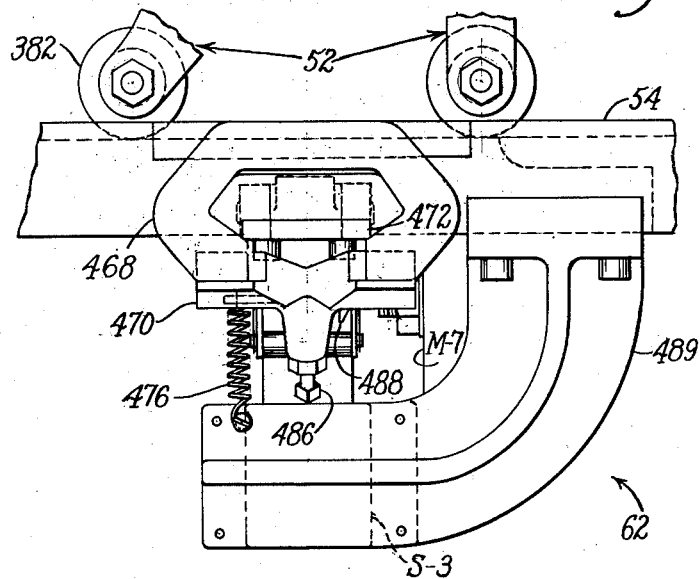
FIG. 34 is a plan view of the parts seen in FIG. 32.
Figure 35:
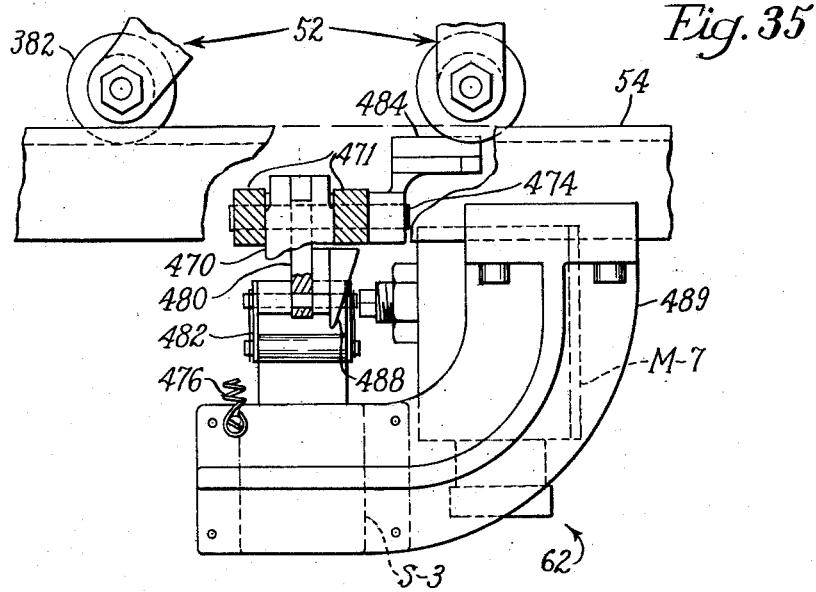
FIG. 35 is a view similar to FIG. 34 with certain parts being broken away and others in section.
Figure 40:
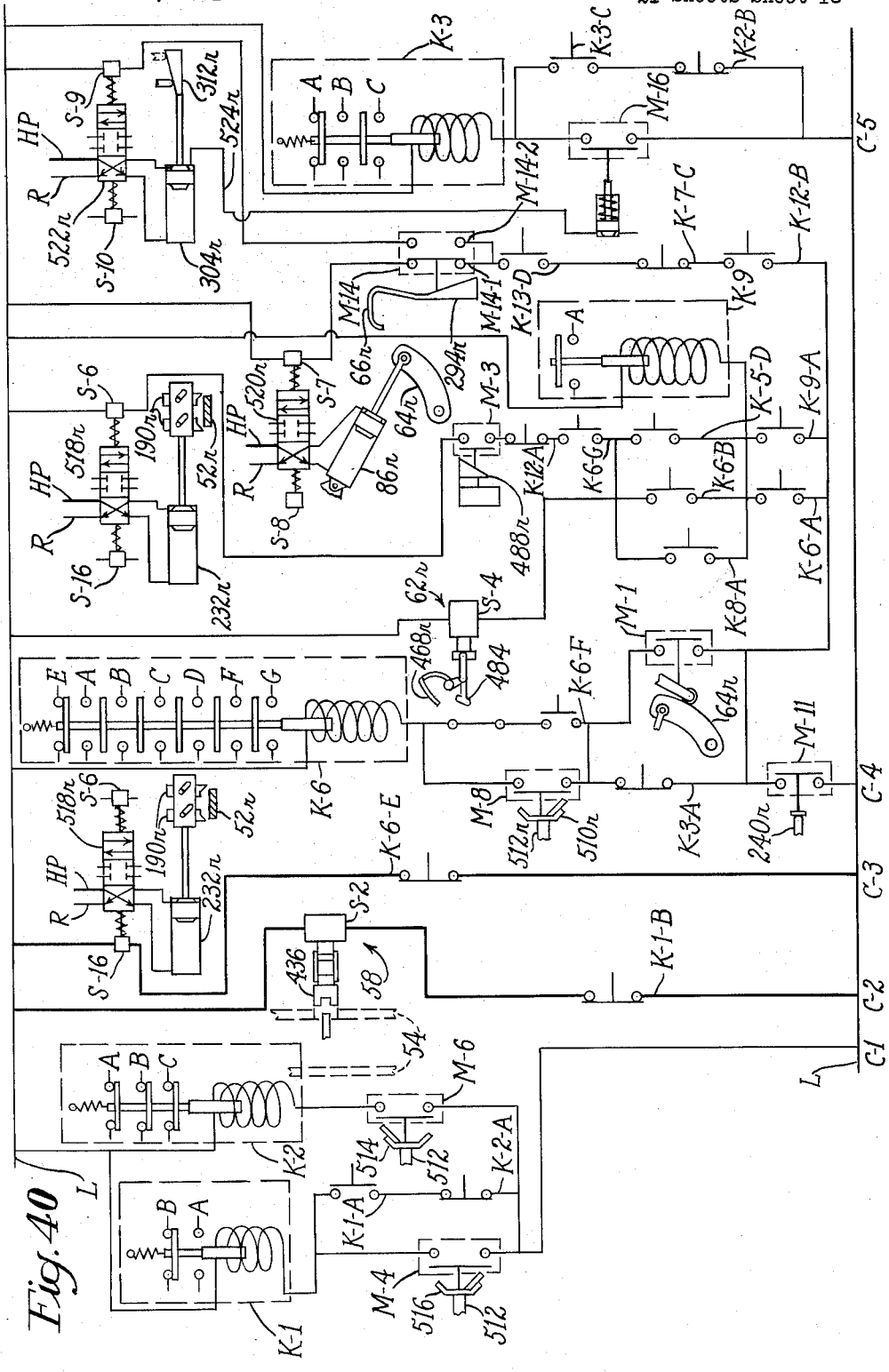
Figure 41:
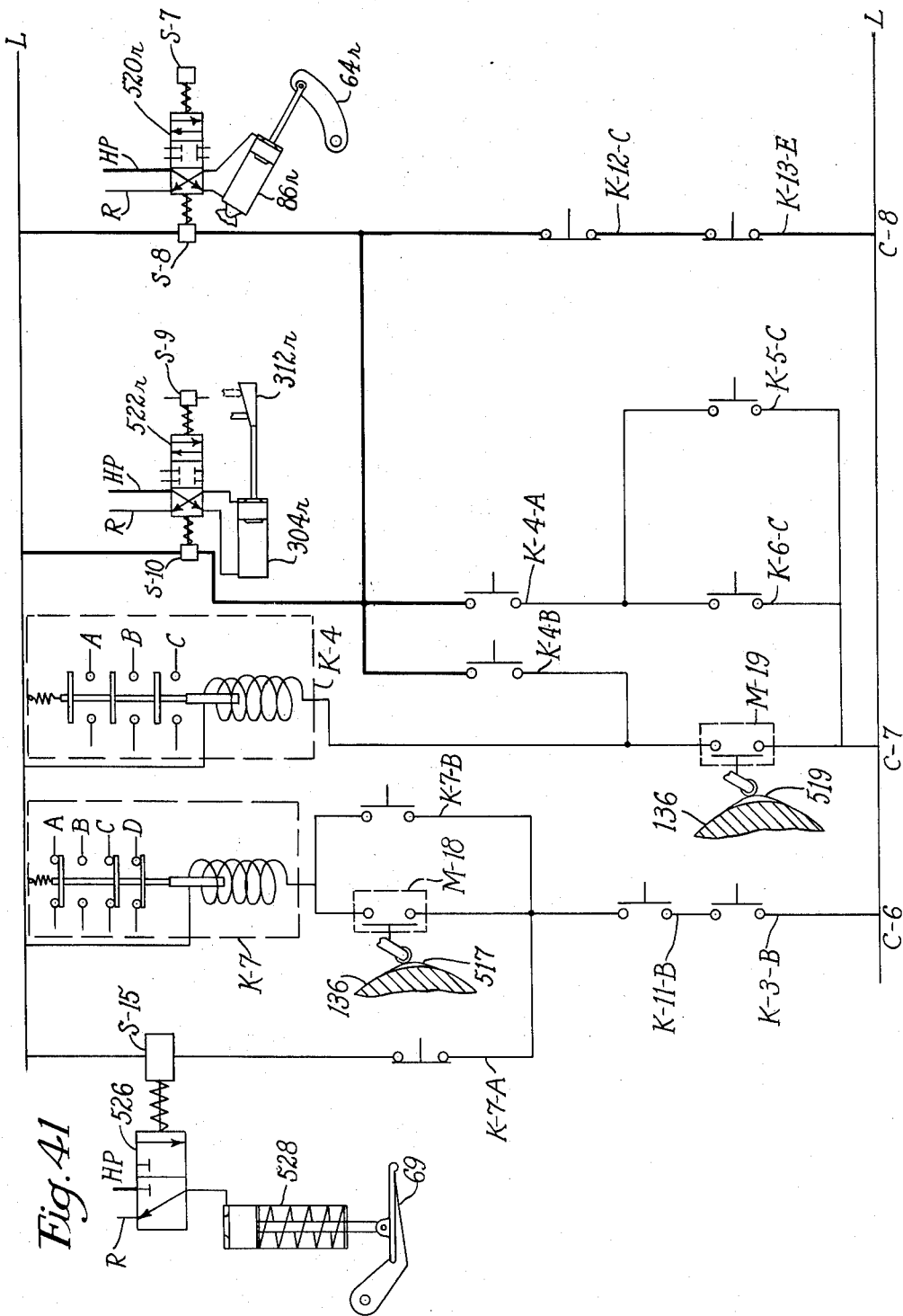
Figure 42:
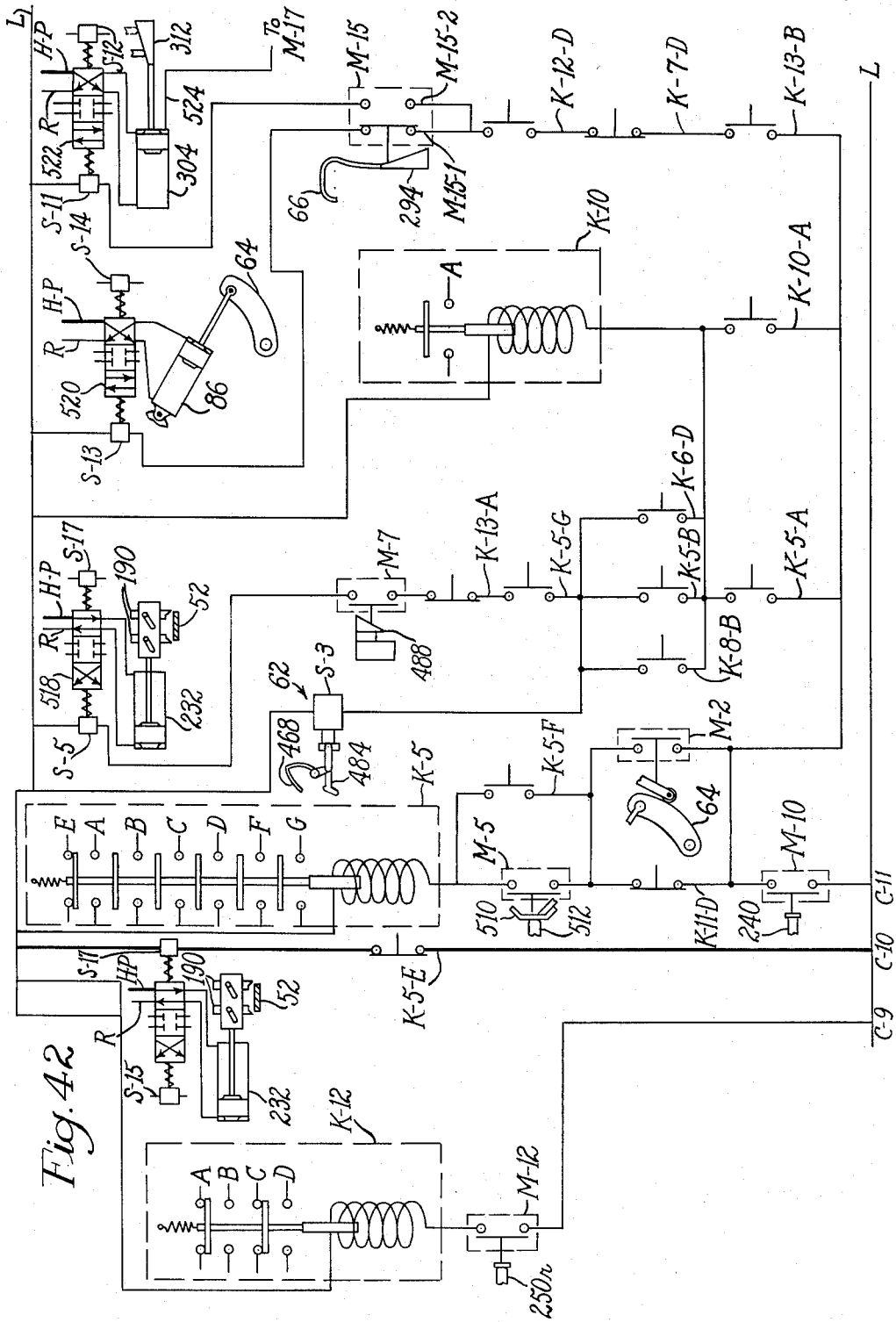
Figure 43:
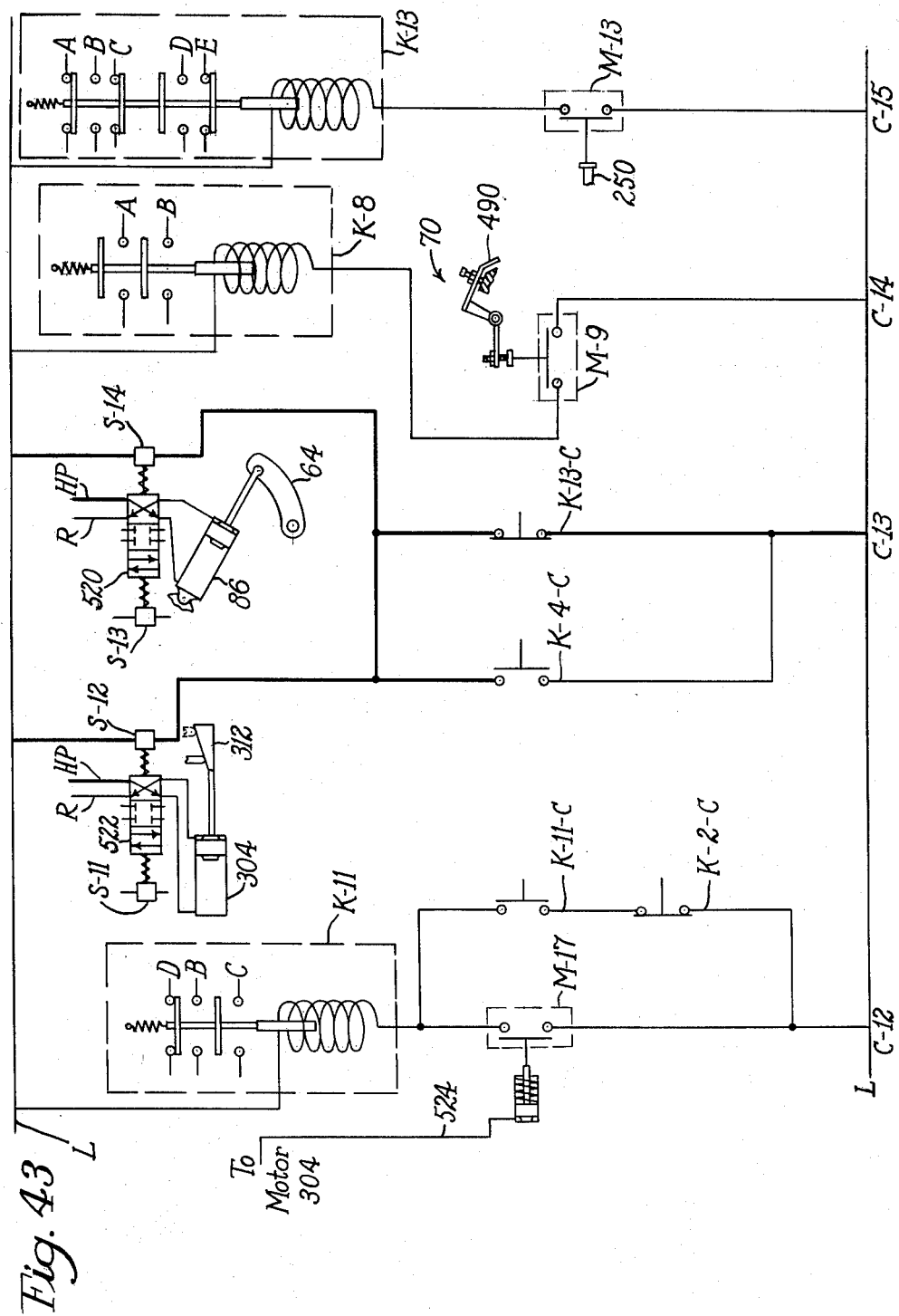

The belt 60 is carried by two sprockets 465 (FIGS. 3 and 29), one of them being driven in the direction indicated by the arrows by power means (not shown). One of these sprockets is located beneath the hold-back station 58; thus driving of the pallets is transferred from the belt 56 to the belt 60 at this point. However, when a pallet 52 engages a pallet 52r at the hold-back station its driving finger 424 will have been brought over the upper rim of the belt 60. To prevent a driving relation between the pallet and belt from being established at this point, a cam 466 (FIGS. 29 and 31) is secured to the outer rail 54. As the pallet 52 approaches the hold-back station, its arm 428 is swung downwardly by engagement with the cam 466 as shown in FIG. 31 thereby preventing the finger 424 from engaging the lugs 426. It will be noted that the cam 466 terminates at a point immediately before the belt 56 passes to the rear of the machine 50 and out of engagement with the driving finger 406. Thus, when the leading pallet is moved out of the hold-back station, permitting engagement of the finger 406 of the next pallet with the belt 56, the pallet 52 will be moved by the belt 56 until the arm 428 clears the cam 466. Thereupon, the finger 424 is engaged with the belt 60 and the pallet 52 is moved into the hold-back station. As the pallet arrives at this station, the sloping surface 448 on the slide 436 will again move the finger 424 out of driving relation with the belt 60 until subsequent energization of the solenoid S-2.

*Pallet Positioning Device*

A pair of positioning devices 62, 62r are provided for locating pallets 52, 52r at their transfer stations 63, 63r, each device having means for disengaging the pallet from the belt 60. Since these devices are substantially duplicates, only one will be described in detail with reference to FIGS. 32 to 35. The positioning device 62 comprises a wedge 468, actuated in a manner to be described, which is arranged to enter between the outer wheels 382 of a pallet 52, thereby locating the pallet with a centering action. The wedge 468 is carried at the end of a lever 470 secured to a pin 474 which is journaled in a bifurcated portion 471 of a fixed bracket 472 secured to the outer rail 54. A spring 476 normally maintains the wedge 468 in its inoperative position as shown in FIG. 32. A bifurcated leg 478 formed integrally with the lever 470 extends downwardly and carries at its lower end a link 480 which is connected by links 482 to the armature of a solenoid S-3. Also secured to the pin 474 is an arm 484 which is arranged to engage the upper surface of the finger carrying arm 428 on the pallet 52.

Upon energizing the solenoid S-3, the links 480, 482 (FIG. 32) are pulled toward the right thereby swinging the wedge 468 between the wheels 382 of the pallet 52. At the same time, the arm 484 engages and depresses the arm 428, withdrawing the finger 424 from the belt 60. Movement of the wedge 468 is limited by the engagement of a stop screw 486, which is threaded into the lever 470, with the bracket 472. In this manner, the pallet 52 is positioned at the transfer station 63 and is disengaged from the belt 60. Thereafter, the pallet will be locked on the jack in the manner described above.

As a safety feature, means are provided to sense the successful operation of the wedge 468 and the arm 484. These means include an offset cam 488 extending from the link 480 which is arranged, on completion of the motion of the wedge 468, to close a normally open microswitch M-7. The microswitch M-7 and the solenoid S-3 are carried by a bracket 489 secured to the outer rail 54.

The construction of the right-hand centering means is essentially identical with that described above; but the wedge actuating solenoid is designated S-4 and the microswitch for sensing proper operation of the wedge 468r is designated M-3.

*Pile-Up Indicator*

Referring to FIG. 2, it will be noted that the pallets 52r and 52 are discharged from the leveling machine 50 by the belt 60 and later are reengaged with the belt 56 which drives them along the rails 54 to further work treating machines (not shown). If, for some reason, the subsequent machine fails to process the shoes as fast as the leveling machine 50 does, pallets will pile up along the rails 54 toward the leveling machine 50. Since the driving connection between the belt 60 and the finger 424 is not automatically interrupted by engagement of one pallet with a preceding pallet, it is desirable that pallets shall not be discharged from the leveling machine 50 unless there is sufficient space beyond the leveling machine for the second or left-hand pallet 52 to pass beyond the belt 60. To this end the pile-up indicator 70 is provided (FIGS. 36 and 37).

This indicator comprises a plate 490 which extends into the path of travel of the pallet wheels 382 and is connected by screws 492 to a bracket 494. The bracket 494 is pivotally connected to a bracket mounting 496 for the inner rail 54. An arm 498 extends from the bracket 494 and carries at its outer end a screw 500 which is arranged to close a normally open microswitch M-9 mounted in fixed relationship to the rail 54. The plate 490 has a cam surface 502 which is engaged by the inner pallet wheels 382. After a front pallet wheel engages the plate 490 and until a rear wheel leaves the plate it will be raised, causing the bracket 494 and the arm 498 to close the microswitch M-9. Thus, through circuitry explained below, pallets will not pass from the transfer stations 63, 63r until preceding pallets have passed beyond the pile-up indicator 70. The outer end (toward the right in FIG. 2) of the plate 490 is spaced from the machine 50 a distance beyond the field of action of the belt 60 sufficient to receive a pair of pallets 52, 52r. The length of the plate 490 is greater than the wheel base of a pallet. With this arrangement it is assured that there is a clear distance beyond the belt 60 sufficient for two pallets before the pair of pallets at the transfer stations are released therefrom.

*Other Electrical Control Structure*

Complete and reliable automatic operation of the work handling apparatus and the leveling machine is effected by control mechanism comprising various switches and switch controls. In the following description reference will first be made to the general function of the various switches referred to above. However, a detailed description of the electrical circuits will follow.

A typical switch operating structure is seen in FIGS. 38 and 39. The particular switch illustrated is microswitch M-5 which actuates the positioning device 62. The switch M-5 is closed by one end of a bell crank 504 which is pivotally mounted on a composite bracket 506 by a shoulder screw 508. The bracket 506 is secured to the outer rail 54 and also carries the microswitch M-5. A cam 510 upon the other end of the bell crank 504 extends into the path of travel of a trip finger 512 on the pallet 52. It will be noted that the corresponding trip finger 512r carried by right-hand pallet 52r is located in a plane substantially below the plane of the trip finger 512. In this manner it is possible to operate various switches selectively according to the passage of the right- or left-hand pallets by arranging the cams, such as the cam 510, in the path of either trip finger. Thus, as a right-hand pallet passes from the hold-back station 58 (FIGS. 2 and 3), the positioning device 62 will not be actuated but the cam 510r of the positioning device 62r is arranged in the path of travel of the finger 512r which will cause the microswitch M-8 to be closed and the right-hand positioning device 62r to be actuated.

After the completion of the leveling operation and the pallets 52, 52r leave the transfer stations 63, 63r, the succeeding pair of pallets are released from the hold-back station 58. For this purpose, a microswitch M-6 is mounted in a manner similar to that of the microswitch M-5 with an actuating cam 514 arranged in the path of the trip fingers 512 on the left-hand pallets 52.

As explained above, the solenoid S-2 at the hold-back station 58 is energized to release pallets therefrom. First, a pallet 52r passes toward the machine and then a pallet 52. Thereafter it is necessary to deenergize the solenoid S-2 to prevent passage of further pallets to the machine 50 until after the leveling operation is again completed. For this purpose, a microswitch M-4 mounted in a manner similar to that of the microswitch M-5 is operated by a cam 516 which is disposed in the path of the trip fingers 512 extending from the left-hand pallets 52.

For reasons which further appear in the description of the electrical circuits, it is necessary to actuate certain control mechanism in timed relationship to the cycle of the leveling machine 50. To this end, cams are mounted on the main cam carrier 136 which rotates one revolution during each machine cycle. Referring to FIG. 1, one cam 517 is shown secured to the periphery of the carrier 136. This cam is arranged to close a microswitch M-18 fixed upon the machine 50. A further can 519 is also mounted on the carrier 136 and is arranged to close a microswitch M-19 which is mounted immediately beside the microswitch M-18.

Further microswitches M-2, M-1 (FIGS. 3 and 4) are provided to sense the presence of the carriers 64, 64r at the transfer stations 63, 63r respectively. Switches M-2 and M-1 are mounted in fixed positions and are of the so-called normally closed type. Therefore when the carriers are in their outer positions at the transfer stations the contacts of these switches are opened by the carrier frames 140, 140r.

*Electrical and Hydraulic Circuits*

Referring now to FIGS. 40 through 43, a complete showing in diagrammatical form of the electrical and fluid circuits of the leveling machine and associated pallet handling mechanism will be seen. As the present invention is not related to any structural improvements in either hydraulic or electrical circuit components, only the diagrammatical showing of these various components is made. The fluid motors are controlled by conventional spring-centering solenoid valves with one exception, which is noted. These valves comprise two solenoids which displace the valve to allow flow of fluid to either one end or the other of its associated fluid motor. When neither solenoid is actuated, the centering means prevent flow of oil in either direction, thus locking the fluid motor in a fixed position. In the figures it will be noted that each control valve is shown twice since the control solenoids are included in different electrical circuits. Similarly, the mechanism controlled by each valve and motor is shown diagrammatically twice. Since fluid systems are well known, there is no showing of a fluid pump. With each depiction of fluid elements the line leading to the high pressure side of a fluid system is indicated by a heavy line HP and the return line leading to the sump is indicated by a lighter line R.

Assuming that a voltage potential exists between the lines L, L, FIGS. 40 through 43 illustrate the various components of the electrical and fluid circuits as they would be when in readiness for pallets to be carried to the machine. At this time circuits C2, C3, C8, C10 and C13 are energized, as indicated by the heavier lines of such circuits. It will be noted that contact K-1-B is closed completing circuit C-2 and energizing solenoid S-2 which retracts the slide 436 at the hold-back station 58. A right-hand pallet 52r is first carried along the rails 54 by the belt 56 and then, at an area adjacent to the hold-back station 58, the auxiliary belt 60 takes over driving of the pallet 52r. Since there is no impediment at the hold-back station (the slide 436 being withdrawn by the solenoid S-2) the pallet 52r continues toward the leveling machine 50. Its trip finger 512r (FIG. 39) passes beneath the various actuating cams of the microswitches M-4, M-5 and M-6. However, the finger 512r will strike the cam 510r closing the microswitch M-8 (circuit C-4). Also, at this time microswitch M-11 (circuit C-4) is closed by displacement of the rod 240r (FIG. 19) as the sensing rod 234r is in engagement with the bell crank 238r (presuming a last is properly seated on the pallet 52r). With the microswitches M-8 and M-11 closed, a circuit which includes the normally closed contacts K-3-A is completed to energize a relay K-6. It is noted that the relay contacts are shown within the outline of the relay box as well as being included directly in the various circuits which they control.

Energization of the relay K-6 initiates the following sequence for positioning the pallet 52r at the transfer station 63r. The relay K-6 is maintained energized by holding contacts K-6-F as closure of the switch M-8 is only momentary. The solenoid S-4 (circuit C-4) of the positioning device 62r is energized through the contacts K-6-B, K-6-A and switch M-11 to swing the wedge 468r (FIG. 33) between and against the wheels of the pallet 52r thereby stopping and positioning said pallet at the transfer station 63r. Simultaneously, the arm 484 disengages said pallet from driven relation with the belt 60.

The pallet 52r is locked on the carrier 64r after completion of operation of the positioning device 62r is indicated through closure of the microswitch M-3 (circuit C-4) by the cam 488r. In the initial condition of the control circuit the fluid motor 232r (FIG. 16) maintains the pallet locking lugs 190r in their inoperative positions. To this end, a self-centering solenoid valve 518r directs pressurized fluid in the proper direction due to its control solenoid S-16 being energized (circuit C-3) through normally closed contacts K-6-E. Solenoid S-16 is deenergized when relay K-6 is energized thereby opening contacts K-6-E and the valve 518r is centered to its neutral position with the lugs 190 still inoperative. When the switch M-3 is closed the valve 518r is in readiness to be shifted to a further position in which pressurized fluid shifts the motor 232r to bring the lugs 190r into their locking positions. This latter shifting of the valve 518r is effected by a solenoid S-6 which is energized through the switch M-3, contacts K-12-A, K-6-G, K-6-B, K-6-A and switch M-11. It should be noted that in several instances there are alternative paths for current flow which will be given specific mention when their function is described.

The succeeding left-hand pallet 52 also passes beyond the hold-back station 58 and is carried toward the transfer station 63 by the belt 60. As the pallet 52 passes beyond the hold-back station 58, its trip finger 512 engages the switch actuating cam 516 closing the microswitch M-4 (circuit C-1). Closure of the switch M-4 energizes a relay K-1. Closure of the switch M-4 is only momentary and the relay K-1 is maintained energized through holding contacts K-1-A and contacts K-2-A. Energization of relay K-1 opens contacts K-1-B thereby deenergizing solenoid S-2 (circuit C-2) allowing the slide 436 to prevent passage of further pallets beyond the hold-back station 58.

As the pallet 52 proceeds, its trip finger 512 strikes the cam 510 thereby causing closure of the microswitch M-5 (circuit C-11). The positioning device 62 and the pallet operating means are thereafter actuated in a manner similar to that described above for the right-hand pallet 52r. At this time microswitch M-10 is closed by displacement of the rod 240 (FIG. 15) as the sensing rod 234 is in engagement with the bell crank 238 (presuming a last is properly seated on the pallet 52). With the microswitches M-5 and M-10 closed a circuit which includes the normally closed contacts K-11-D is completed to energize a relay K-5. The relay K-5 is maintained energized by holding contacts K-5-F, as closure of the switch M-5 is only momentary. Energization of the relay K-5 initiates the following sequence for positioning the pallet 52 at the transfer station 63. The solenoid S-3 on the positioning device 62 is energized through contacts K-5-B, K-5-A and switch M-10 to swing the wedge 468 between the wheels of the pallet 52 thereby stopping and positioning the pallet at the transfer station 63. Simultaneously, the arm 484 disengages the pallet from driven relation with the belt 60.

The pallet 52 is locked on the carrier 64 after completion of operation of the positioning device 62 is indicated through closure of the microswitch M-7 (circuit C-11) by the cam 488. In the initial condition of the control circuit, the fluid motor 232 maintains the pallet locking lugs 190 in their inoperative positions. To this end, a self-centering solenoid valve 518 directs pressurized fluid in the proper direction due to its control solenoid S-17 being energized (circuit C-9) through normally closed contacts K-5-E. Solenoid S-17 is deenergized when relay K-5 is energized and contacts K-5-E are opened. The valve 518 is then centered to its neutral position with the lugs 190 still inoperative. Thus, when the switch M-7 is closed the valve 518 is in readiness to be shifted to a further position in which pressurized fluid displaces the motor 232 to bring the lugs 190 into their locking positions. This latter shifting of the valve 518 is effected by a solenoid S-5 (circuit C-11) which is energized through the switch M-7, contacts K-13-A, K-5-G, K-5-B, K-5-A and switch M-10.

Figure 4:
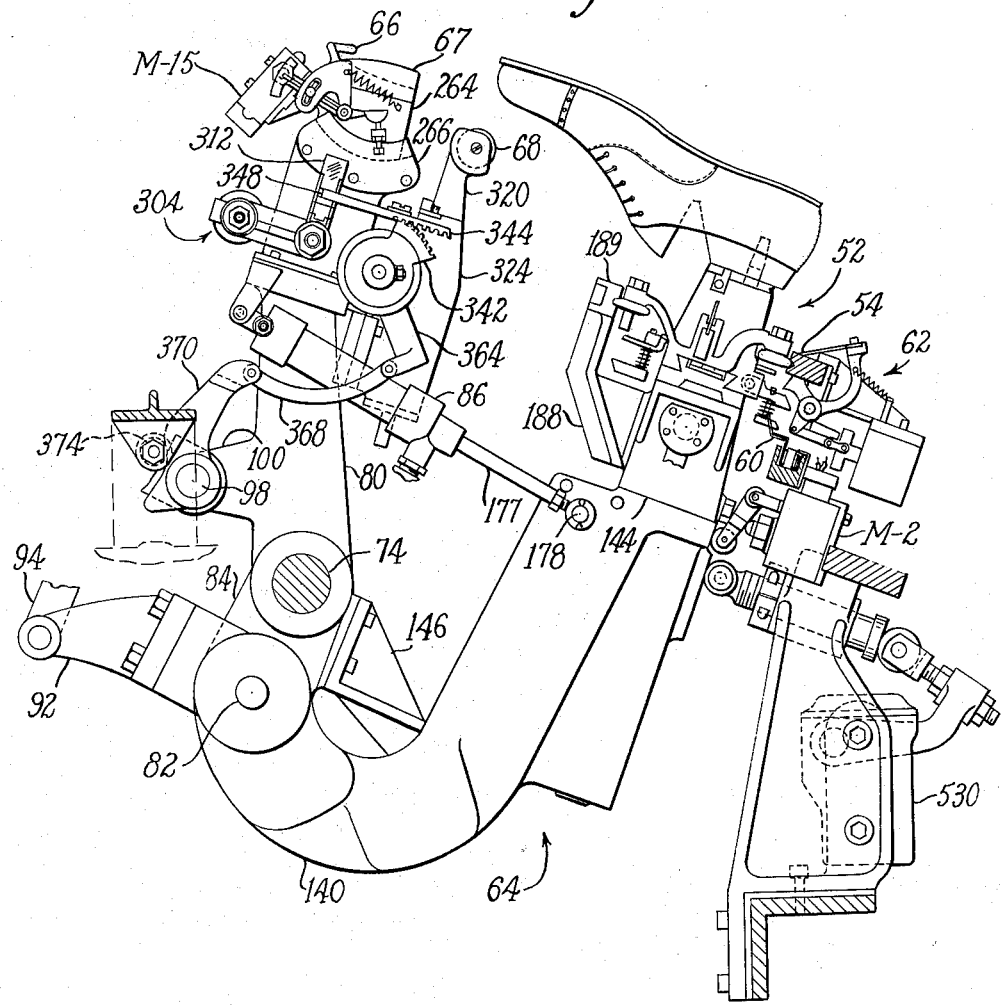
FIG. 4 is a section taken on the line IV—IV of FIG. 2 showing shoe support structure.

When both pairs of lugs 190, 190r have been shifted to their locking positions, the switches M-13 (circuit C-15) and M-12 (circuit C-9) are closed by the screws 250, 250r respectively, which extend from the cam plates 214, 214r (FIGS. 16-19). Closure of the switches M-13, M-12 directly energizes relays K-13, K-12 respectively to initiate further sequencing which causes the carriers 64, 64r to transfer the pallets 52, 52r from the transfer stations into operative relation to the machine 50. As above mentioned, the power source for such movement is provided by the fluid motors 86, 86r (FIGS. 4 and 5). In the initial condition of the control circuit the motor 86 maintains the carrier 64 in its outer position. To this end, a self-centering solenoid valve 520 directs pressurized fluid to the motor 86 in the proper direction due to its control solenoid S-14 being energized (circuit C-13) through normally closed contacts K-13-C. When the pallet 52 is properly locked, relay K-13 is energized thereby opening contacts K-13-C and deenergizing solenoid S-14 and the valve 520 is centered to its neutral position causing the carrier 64 to be locked at the transfer station 63. In a similar manner the carrier 64r is maintained in its outermost position as a solenoid S-8 (circuit C-8) maintains a valve 520r displaced to deliver pressurized fluid to the motor 86r in the desired manner. The solenoid S-8 is energized through the contacts K-12-C and K-13-E. The solenoid S-8 will be deenergized and the valve 520r centered to its neutral position by energization of either the relay K-13 or the relay K-12 depending upon which pallet is first locked on a carrier. With both valves 520, 520r in their neutral positions the motors 86, 86r are in readiness to be actuated to move the carriers 64, 64r toward the machine 50. The valves 520, 520r are displaced at once to accomplish this end by energization of the solenoids S-13 (circuit C-11) and S-7 (circuit C-4) upon the closing of the switches M-13, M-12, respectively. Energization of the solenoid S-13 is completed through microswitch contacts M-15-1, contacts K-12-D, K-7-D, K-13-B and switch M-10. In a similar manner solenoid S-7 (circuit C-4) is energized through microswitch contacts M-14-1, contacts K-13-D, K-7-C, K-12-B and switch M-11. The circuits for the solenoids S-13 and S-7 are interlocked so that the carriers leave the transfer stations simultaneously. At this point it should be noted that, the carriers 64, 64r having left the transfer stations, the switches M-1 (circuit C-4) and M-2 (circuit C-11) are now closed to provide an alternate path for energizing the relays K-6 and K-5 respectively.

When the toe of a shoe carried by the left-hand pallet 52 engages the toe gage 66, microswitch contacts M-15-1 (circuit C-11) are opened by the cam 294 thereby deenergizing solenoid S-13. The valve 520 is automatically centered in its locking position thereby locking the carrier 64 in a position which is determined by the length of the shoe. Similarly, when the toe of a shoe carried by the pallet 52r engages the toe gage 66r, microswitch contacts M-14-1 (circuit C-4) are opened by the cam 294r thereby deenergizing solenoid S-7. The valve 520r is automatically centered in its locking position whereby the carrier 64r is locked in a position which is determined by the length of the shoe, independently of the position of the carrier 64. With this independent control of the carriers 64, 64r it is possible to have a large shoe on one pallet and a small shoe on the other pallet and to position both shoes correctly with respect to the machine. This end is furthered by the compound motion which is imparted to the pallet receiving base 144 as well as by the automatic adjustment of the pantograph linkage described above.

The shoes now having been correctly positioned with respect to the machine, the toe pads 67, 67r are raised to jack or lock the shoes through actuation of the fluid motors 304, 304r (FIGS. 9-11). In the original condition of the control circuit, the fluid motor 304 maintains the toe pad actuating wedge 312 in a position which allows the toe pad 67 to be lowered. This is effected by energization of the solenoid S-12 (circuit C-13) through contacts K-13-C to displace a valve 522 which controls the motor 304. This solenoid will have been deenergized upon energization of the relay K-13 after the pallet 52 has been locked thereby permitting the valve 522 to shift to its neutral position. Similarly, the wedge 312r allows the toe pad 67r to be in its lower position as a solenoid S-10 (circuit C-8) displaces the control valve 522r to a position in which fluid flows to the motor 304r to accomplish this end. Energization of the solenoid S-10 is completed through the contacts K-12-C and K-13-E. Solenoid S-10 is deenergized by energization of either the relay K-12 or the relay K-13. The toe pads 67, 67r are raised to jack their respective shoes independently. The toe pad 67 is raised by closure of the switch contacts M-15-2 (circuit C-11) when the toe of a shoe engages the gage 66. This in turn causes the control valve 522 to be shifted so that fluid flows to the motor 304 to cause the wedge 312 to raise the toe pad 67. Displacement of the valve 522 is effected by a solenoid S-11 which is energized through switch contacts M-15-2, contacts K-12-D, K-7-D, K-13-B, and switch M-10. The toe pad 67r is raised in a similar manner as the valve 522r (circuit C-4) is displaced by energization of a solenoid S-9 through switch contacts M-14-2, contacts K-13-D, K-7-C, K-12-B and switch M-11. As the toe pad 67 is raised, fluid pressure is built up which is transmitted through a line 524 (circuit C-12) from the motor 304 to a pressure responsive switch M-17. When the desired jacking pressure is reached, switch M-17 closes thereby energizing relay K-11. The relay K-11 is maintained energized through holding contacts K-11-C and contacts K-2-C in case there should be pressure variations in the line 524 which would allow the switch M-17 to open. In a similar manner, a line 524r (circuit C-5) transmits the jacking pressure applied to the toe pad 67r from the motor 304r to a pressure responsive switch M-16, closure of which causes energization of a relay K-3. The relay K-3 is maintained energized through holding contacts K-3-C and K-2-B in case variations in pressure in the line 524r should allow the switch M-16 to open. With both shoes locked or jacked the portions of the jack comprising the toe pad 67, the cone support 68, the carrier 64 and pallet 52 are mechanically locked together in readiness for initiation of the leveling cycle in accordance with the mechanical description given above. This locked condition is indicated by energization of relays K-11 and K-3 which cause closure of contacts K-11-B and K-3-B (circuit C-6). When these contacts are closed, a solenoid S-15 is energized through contacts K-7-A. Energization of solenoid S-15 displaces a spring biased control valve 526 so that a single acting motor 528 depresses the machine treadle 69 to operate a single revolution clutch and actuate the leveling machine 50. Shortly after the beginning of the leveling machine cycle, the microswitch M-18 is closed by the cam 517 on the main cam carrier 136 thereby energizing relay K-7 (circuit C-6) through contacts K-11-B and K-3-B. Closure of the switch M-18 is momentary but relay K-7 is maintained energized by holding contacts K-7-B. Energization of the relay K7 causes the following sequence for preparing the control circuit to return the pallets to the pallet handling system upon completion of the leveling cycle. Contacts K-7-D (circuit C-11) are opened thereby deenergizing solenoid S-11 permitting the control valve 522 to switch to its neutral or locked position in readiness for the motor 304 to allow the toe pad 67 to lower. Similarly the motor 304r is placed in readiness to allow the toe pad 67r to lower as the control valve 522r shifts to its neutral position as the solenoid S-9 is deenergized by opening of the contacts K-7-C (circuit C-4). Also at this time contacts K-7-A are opened deenergizing the solenoid S-15 so that the control valve 526 is shifted to allow the trip treadle 69 to be raised.

It should be noted at this time that relay K-9 (circuit C-4) is energized through contacts K-6-A and switch M-11. Also relay K-10 (circuit C-11) is energized through contacts K-5-A and switch M-10.

As the end of the leveling cycle approaches, microswitch M-19 (circuit C-7) is closed by the cam 519 on the main cam carrier 136, whereby a relay K-4 is energized. Closure of the switch M-19 is momentary and a holding circuit is provided for maintaining the relay K-4 energized through contacts K-4-B, K-4-A, and either K-6-C or K-5-C.

The contacts of the relay K4 are closed just as the cycle of operation of the leveling machine 50 is completed. Simultaneously, the left-hand carrier 64 is returned to the transfer station 63 and the toe pad 67 is lowered by closure of the contacts K-4-C (circuit C-13). These ends are accomplished by energization of the solenoid S-12 which displaces the control valve 522 to actuate the motor 304 displacing the wedge 312 to allow the toe pad 67 to lower. Also solenoid S-14 is energized to displace the control valve 520 to actuate the motor 86 to swing the carrier 64 back to the transfer station 63. Similarly, closure of the contacts K-4-A (circuit C-7) completes a circuit through either contacts K-6-C or K-5-C to energize solenoids S-10 and S-8. Energization of these solenoids effects lowering of the toe gage 67r and movement of the carrier 64r to the transfer station 63r.

The right-hand carrier 64r, upon arriving at the transfer station 63r, opens microswitch M-1 (circuit C-4) thereby deenergizing relay K-6 (K-3 is energized at this time and contacts K-3-A are opened). Contacts K-6-E are now closed and solenoid S-16 (circuit C-3) is energized to displace the control valve 518r to effect movement of the locking lugs 190r to their inoperative positions. The positioning device 62r remains in operative position and the pallet 52r does not return to driven relation with the belt 60 at this time since contacts K-9-A and K-5-D continue to energize solenoid S-4. When the left-hand jack 64 returns to the transfer station 63, switch M-2 (circuit C-11) is opened and relay K-5 is deenergized (contacts K-11-D are open as relay K-11 is still energized). Contacts K-5-E (circuit C-10) are now closed and solenoid S-17 is energized to displace the control valve 518 to cause the locking lugs 190 to move to their inoperative positions. If the right-hand carrier 64r is not properly located in the transfer station 63r the pallet 52 will remain out of driven relation with the belt 60 as the solenoid S-3 controlling the positioning device 62 remains energized through the contacts K-10-A, K-6-D and switch M-10.

When both carriers are properly located at their transfer stations, both relays K-6 and K-5 will be deenergized and all the contacts K-6-B, K-5-B, K-6-D and K-5-D will be open to deenergize the solenoids S-3 and S-4 simultaneously. Thus, the pallets 52, 52r are returned to driven relation with the belt 60 simultaneously and are carried away from the leveling machine 50.

When both relays K-5 and K-6 are deenergized, contacts K-6-C and K-5-C open to deenergize relay K-4 (circuit C-7). At this point circuit C-13 is momentarily deenergized until circuit C-15 is deenergized by opening of the switch M-13, as the pallet 52 is unlocked from its carrier. Circuit C-7 is deenergized and circuit C-8 is later energized as the pallet 52r is unlocked and switch M-12 opens to deenergize circuit C-9. It will be noted that contacts K-13-E are included in the circuit C-7 to insure that the relay K-4 will be deenergized in case the left-hand pallet 52 is unlocked after the right-hand pallet is unlocked thereby opening relays K-5 and K-13 before the relays K-6 and K-12 are deenergized.

As the pallets travel away from the machine 50, the trip finger 512 of the left-hand pallet 52 strikes the actuating cam 514 thereby closing the microswitch M-6 (circuit C-1) which in turn momentarily energizes relay K-2. Energization of the relay K-2 resets the control circuit to its start or original condition in readiness to receive further pallets. Contacts K-2-A are opened deenergizing relay K-1 which in turn causes closure of K-1-B and energization of solenoid S-2 (circuit C-2) at the hold-back station 58. The slide 436 is retracted and further pallets may be carried to the transfer stations 63, 63r. Circuit C-3 is energized as relay K-6 was deenergized upon return of the carrier 64r to the transfer station. The entire circuit C-4 is deenergized when the pallet 52r moves from the transfer station 63 thereby opening the switch M-11. Circuit C-5 and relay K-3 are deenergized by momentary energization of relay K-2 and opening of contacts K-2-B. Circuit C-6 and relay K-7 are deenergized by opening of contacts K-3-B or K-11-B. Circuit C-7 including relay K-4 is deenergized by opening of contacts K-6-C and K-5-C. Circuit C-8 is energized by the normally closed contacts K-12-C and K-13-E. Circuit C-9 and relay K-12 are deenergized after the pallet 52r is unlocked from the carrier 64r. Circuit C–10 is energized by normally closed contacts K–5–E. Circuit C–11 is deenergized as the pallet 52 moves from the transfer station 63 and the switch M–10 is opened. Circuit C–12 is deenergized by momentary energization of the relay K–2 and opening of contacts K–2–C. Circuit C–13 is energized through normally closed contacts K–13–C and circuit C–15 is deenergized as the pallet 52 is unlocked from the carrier 64.

In case a pile up condition exists at the time the carriers return to the transfer stations, discharge of pallets from the transfer station is prevented. The pallets just beyond the leveling machine will cause the plate 490 at the pile-up indicator 70 to be raised, causing closure of the switch M–9 (circuit C–14) and energization of the relay K–8. With the contacts K–8–A closed a portion of circuit C–4 will remain energized through switch M–11, contacts K–9–A and K–8–A to maintain the solenoid S–4 energized, it being understood that switch M–11 and contacts K–9–A are closed at this time. Therefore, after the carrier 64r returns to the transfer station 63r the positioning device 62r remains effective in preventing the pallet 52r from returning to driven relation with the belt 60. Similarly, the pallet 52 is disconnected from the belt 60 when a pile-up condition exists as the solenoid S–3 is energized through contacts K–8–B, K–10–A and switch M–11 (circuit C–11). When the pile-up condition is relieved, switch M–9 again opens, deenergizing relay K–8. When the contacts K–8–A and K–8–B open, solenoids S–4 and S–3 are deenergized and the circuit is reset in the manner described above as the pallets are carried from the transfer stations by the belt 60.

Brief Summary of Operation

Right- and left-hand pallets 52r, 52 are alternately disposed along the rails 54 of the pallet handling system and are presented to the leveling machine 50, one pair at a time, with a right-hand pallet 52r leading. The solenoid S–2 (FIGS. 26 and 28) at the hold-back station 58 normally is energized to retract the slide 436. Therefore, the first pallet 52r is not detained at the hold-back station but is carried to the right-hand transfer station 63r by the belt 60. When the next pallet 52 passes the hold-back station 58 the switch M–4 (FIG. 2) is closed by the trip finger 512 (FIG. 39), the solenoid S–2 is deenergized and the slide 436 returns to locking position to stop the next pallet at the hold-back station 58. Meanwhile, the pallet 52 is carried by the belt 60 to the transfer station 63.

The trip finger 512r (FIG. 39) of the right-hand pallet 52r causes closure of the switch M–8 which in turn actuates the positioning device 62r. The pallet 52r is thus stopped and positioned at the transfer station 63r and is disengaged from the belt 60. The trip finger 512 of the pallet 52 causes closure of the microswitch M–5 which in turn actuates the positioning device 62 to stop and locate the pallet 52 at the transfer station 63 and to disengage it from the belt 60. Upon the complete operation of both positioning devices 62r, 62, and in response to the operation of switches M–3, M–7, the pallets 52, 52r are positioned and positively locked by the lugs 190 on the upper pallet receiving surfaces of carriers 64, 64r respectively.

When both pallets have been positioned and locked on their respective carriers, in response to the operation of switches M–13 and M–12 by the locking mechanism (there being a last fully assembled on each pallet as indicated by closure of switches M–10 and M–11), the carriers 64, 64r are simultaneously moved away from the transfer stations 63, 63r. This movement is effected by fluid motors 86, 86r which carry the shoes toward the leveling machine 50 until the toes of the shoes engage the toe gages 66, 66r. Upon displacement of the toe gages 66, 66r, and in response to the operation of switches M–14, M–15 flow of fluid to the motors 86, 86r is stopped and the carriers 64, 64r are locked with the toes of the shoes at predetermined points with relation to the leveling machine 50. Also, the soles of the shoes are disposed at a predetermined level with respect to the roll R regardless of the size of the shoe.

To accomplish this end and referring to the left-hand station of the machine, the carrier 64 is raised by the cam plate 150 (FIG. 6) working through the bell crank 160 as the carrier moves toward the machine. Inward movement of the carrier 64 not only raises the shoe to bring its sole to a predetermined level but also automatically adjusts the pantograph arrangement seen in FIG. 5 so that the sole of the shoe will automatically be treated according to its size. The right-hand pallet 64r is dealt with in an identical manner, equivalent means being provided for bringing the toe end of the shoe and the plane of its bottom into the desired relation to the machine. Likewise, a second pantograph arrangement is provided for the right-hand station. Thus, it is not necessary that the same size shoes be carried by the pallets 52, 52r which are simultaneously presented to the machine 50. Regardless of size, each shoe will be properly located and treated.

When both carriers 64, 64r have been brought fully into the operative stations of the machine, and in response to the operation of the switches M–14, M–15 by the toe gages 66, 66r, the motors 304, 304r (FIG. 9) operate the wedges 312, 312r to raise the toe pads 67, 67r respectively and cause jacking pressure to be applied to each last. Simultaneously, the cone support 68, 68r will have been raised against the lasts and, before the cycle of the leveling machine is initiated, are firmly pressed against the lasts and locked in this position. When the requisite jacking pressure of the toe pads 67, 67r against the lasts has been reached and in response thereto, pressure sensitive switches M–17, M–16 are operated to cause the fluid motor 528 to depress the treadle 69 of the machine, whereby a cycle of operation of the leveling machine is initiated.

Operation of the leveling machine 50 proceeds in a conventional manner. A cam carrier 136 carries the main operating cam of the leveling machine. It also has on its peripheral surface the controlling cam segments 517 and 519 which, near the end of the leveling cycle, operate switches M–18, M–19 to initiate a series of events including the lowering of the toe pads 67, 67r and cone supports 68, 68r, the unlocking of the pallets 52, 52r and the return of the carriers 64, 64r to the transfer stations 63, 63r. Dashpot buffers 530, 530r (FIG. 4) absorb any excessive shock which might occur when the carriers 64, 64r arrive at the transfer stations.

Upon the return of the carriers 64, 64r to the transfer stations 63, 63r they operate the switches M–1, M–2 causing the positioning devices 62, 62r to be simultaneously deenergized whereby the pallets 52, 52r are released from the transfer stations and are reengaged with the belt 60, if there are no pallets within the field of action of the pile-up indicator 70. Thereafter, the pallets are carried by the belt 56 to further work-treating machines. As the left-hand pallet 52 passes from its transfer station, its trip finger 512 causes closure of the microswitch M–6 which in turn causes the electrical and hydraulic circuits to be reset into their original condition, the slide 436 at the hold-back station 58 now being retracted to allow the succeeding pair of pallets to advance to the leveling machine.

If there are enough pallets piled up along the rails 54 at the discharge side of the leveling machine to operate the pile-up indicator 70, the switch M–9 will be closed. Closure of this switch prevents the positioning devices 62, 62r, from being deenergized. Therefore, whenever the carriers 64, 64r return pallets 52, 52r to the transfer stations while the above-mentioned pile-up condition exists such pallets will be held at the transfer stations until the condition ceases to exist and the positioning devices are deenergized.

Having thus described our invention, what we claim as new and desire to secure by Letters Patent of the United States is:

1. An article handling system for presenting a pair of articles to a pair of adjacent work stations substantially simultaneously for performing a similar operation on each article, comprising conveyor means extending past both work stations, article hold-back means disposed on the conveyor, means releasing a pair of articles from the holdback means, means permitting the first article of said pair to pass the first work station, means stopping said first article at the second work station, means stopping said second article at the first work station, means responsive to the arrival of both articles at their respective work stations for starting said operation on said articles, means responsive to the completion of said operation for causing said articles to be removed from the work stations by the conveyor, means responsive to the removal of said articles from the work stations for releasing another pair of articles from the hold-back means.

2. An article handling system for presenting a pair of articles substantially simultaneously to first and second adjacent work stations for performing a similar operation on each article comprising conveyor means extending past said first and second work stations in succession, said conveyor having a feed portion, an article positioning portion having first and second positioning means associated with said first and second work stations respectively to position an article in predetermined relation thereto, a discharge portion, said feed portion having article hold-back means, means releasing a pair of articles from the hold-back means to the positioning portions of the conveyor, means permitting the leading article of said pair to pass the first positioning means, means stopping said leading article at the second positioning means, means stopping the trailing article of said pair at the first positioning means, means responsive to the arrival of both of said articles at the positioning means for starting the operation at said work stations, means responsive to the completion of said operation to cause said positioning portion of the conveyor to transfer said articles from the work stations to the discharge portion of the conveyor, means responsive to the discharge of said articles from the work stations to release another pair of articles from the feed portion.

3. An article handling system for transferring articles into and out of a work station at which a predetermined operation is to be performed on the article, comprising a conveyor track extending past the work station, a conveyor belt associated with the track for moving articles along the track, a section of the track opposite the work station being movable into and out of the work station, means disposed ahead of said track section for stopping articles approaching said section of the track, means releasing an article onto said section of the track, means responsive to the arrival of said article on said section of the track for causing said section of the track and the article carried thereby to move into the work station, means responsive to the completion of the operation at the work station for moving said section of the track to its original position and reengaging said article with the conveyor belt, and means responsive to the removal of said article from said track section for actuating said means for releasing an article into said section of track.

4. An article handling system for transferring articles into and out of a work station at which a predetermined operation is to be performed on the article comprising a main conveyor and an auxiliary conveyor, said auxiliary conveyor having a transfer station disposed therein, said main conveyor being adapted to deliver articles to one end of said auxiliary conveyor and remove them from the other end, means responsive to the arrival of an article at the transfer station from the main conveyor for actuating transfer means to convey the article to the work station, means responsive to the return of the article to the transfer position to cause said auxiliary conveyor to convey the article to the main conveyor at said other end of the auxiliary conveyor and to release another article to the auxiliary conveyor from the main conveyor at said one end of the auxiliary conveyor.

5. An article handling system for transferring articles into and out of a work station at which a predetermined operation is to be performed on the article comprising a main conveyor and an auxiliary conveyor, said auxiliary conveyor having a pair of transfer stations disposed therein associated with a pair of work stations, said main conveyor by-passing said auxiliary conveyor and being adapted to deliver articles to a receiving end of the auxiliary conveyor and receive articles from a discharge end of the auxiliary conveyor, holdback means on said main conveyor, means for releasing a pair of articles from the holdback means to the receiving end of the auxiliary conveyor, means permitting the first article of said pair to pass through the first transfer station, means stopping the second article of said pair at the first transfer station, means stopping the first article of said pair at the second transfer station, means responsive to the arrival of both articles at the transfer stations for actuating means for substantially simultaneously transferring said articles into the work stations, means responsive to the return of the articles from the transfer stations to the work stations for causing the auxiliary conveyor to transfer the articles from the discharge end of the auxiliary conveyor to the main conveyor, and means responsive to the departure of said articles from the transfer stations for actuating said means for releasing another pair of articles from the holdback means.

References Cited in the file of this patent

UNITED STATES PATENTS

| | | |
|---|---|---|
| 2,104,739 | Eppler et al. | Jan. 11, 1938 |
| 2,328,572 | Miller | Sept. 7, 1943 |
| 2,903,722 | McConchie et al. | Sept. 15, 1959 |
| 2,940,094 | Bromfield | June 14, 1960 |
| 2,960,703 | Dorosy | Nov. 22, 1960 |